United States Patent
Agarwal et al.

(10) Patent No.: US 9,560,069 B1
(45) Date of Patent: Jan. 31, 2017

(54) METHOD AND SYSTEM FOR PROTECTION OF MESSAGES IN AN ELECTRONIC MESSAGING SYSTEM

(71) Applicant: Symantec Corporation, Mountain View, CA (US)

(72) Inventors: Preeti Agarwal, Pune (IN); Rohit Bhagwat, Mumbai (IN)

(73) Assignee: Symantec Corporation, Mountain View, CA (US)

( * ) Notice: Subject to any disclaimer, the term of this patent is extended or adjusted under 35 U.S.C. 154(b) by 99 days.

(21) Appl. No.: 13/905,913

(22) Filed: May 30, 2013

Related U.S. Application Data

(60) Provisional application No. 61/732,388, filed on Dec. 2, 2012.

(51) Int. Cl.
    *G06F 21/56*    (2013.01)
    *H04L 29/06*    (2006.01)
(52) U.S. Cl.
    CPC ......... *H04L 63/145* (2013.01); *H04L 63/1416* (2013.01); *G06F 21/56* (2013.01)
(58) Field of Classification Search
    CPC ...... H01L 24/03; H01L 24/05; H01L 23/3192; H04L 63/145; H04L 63/1416; G06F 21/56
    USPC .............................................. 726/23, 24, 22
    See application file for complete search history.

(56) References Cited

U.S. PATENT DOCUMENTS

| | | | | |
|---|---|---|---|---|
| 7,096,500 B2 * | 8/2006 | Roberts | ............... | H04L 63/1416 709/206 |
| 7,237,008 B1 * | 6/2007 | Tarbotton | ............. | G06Q 10/107 709/206 |
| 7,340,772 B2 * | 3/2008 | Panasyuk | ................ | G06F 21/31 726/15 |
| 7,340,774 B2 * | 3/2008 | Hursey et al. | .................. | 726/22 |
| 7,836,502 B1 * | 11/2010 | Zhao | .................... | G06F 21/6218 726/22 |
| 2009/0199297 A1 * | 8/2009 | Jarrett | .................... | G06F 21/566 726/24 |
| 2009/0293125 A1 * | 11/2009 | Szor | ........................ | G06F 21/56 726/24 |

FOREIGN PATENT DOCUMENTS

| | | | | |
|---|---|---|---|---|
| DE | EP 2169897 A1 * | 3/2010 | ............. | H04L 12/58 |
| EP | 2169897 A1 * | 3/2010 | | |

\* cited by examiner

*Primary Examiner* — Jung Kim
*Assistant Examiner* — Thomas Ho
(74) *Attorney, Agent, or Firm* — Patent Law Works LLP

(57) ABSTRACT

Methods, computer program products, computer systems, and the like, which protect messages in an electronic messaging system, are disclosed. The methods, computer program products, computer systems, and the like include detecting an occurrence of an event, and, in response to the detecting the occurrence of the event, scanning a message. The occurrence of the event indicates that the message should be scanned. The message includes recipient information, which identifies a recipient of the message, and is stored in a message store. The message has been received at a message destination associated with the recipient. The scanning uses a malware definition. The scanning is performed prior to the message being retrieved from the message store in response to a request by the recipient to retrieve the message from the message store. The event is other than the request by the recipient to retrieve the message from the message store.

17 Claims, 19 Drawing Sheets

METHOD AND SYSTEM FOR PROTECTION OF MESSAGES IN AN ELECTRONIC MESSAGING SYSTEM

CROSS-REFERENCE TO RELATED APPLICATIONS

This application claims the benefit of Provisional Patent Application Nos. 61/732,388 filed on Dec. 2, 2012, and 61/732,721 filed on Dec. 3, 2012, both entitled "Method and System for Protection of Messages in an Electronic Messaging System" and both having Preeti Agarwal and Rohit Bhagwat as inventors. The above-referenced provisional applications are hereby incorporated by reference, in their entirety and for all purposes.

FIELD OF THE DISCLOSURE

The present disclosure relates to the protection of electronic messaging systems and, more particularly, to the detection of malware associated with electronic messages conveyed via such electronic messaging systems.

BACKGROUND

Electronic messaging systems (including, e.g., electronic mail (email) systems, instant messaging systems, text messaging systems, and other such messaging systems) have become ubiquitous in both the commercial and private spheres, and have changed the way businesses and individuals communicate with one another, allowing users to quickly and easily exchange information. For example, an individual can easily send and receive text messages, emails, or the like, using one of any number of computing devices, including personal computing devices (e.g., so-called "smart phones," tablet devices, and the like), laptop computers, desktop computers, and the like, as well as larger computing systems (e.g., availing themselves of access to server systems, cloud-based systems, and the like). In a business setting, an employee can draft an electronic document, attach that document to an electronic message, and send the message (including the attached document) to other employees, allowing those employees to access the document at their convenience, without having to obtain a physical copy of the document.

As businesses and individuals increase their usage of electronic forms of communication, however, new problems have begun to arise. For example, the increasing use of email, over both the Internet and private networks, increases the exposure of individual users and operations to malicious disruption. One such problem is the possibility of malware attacks by way of such electronic messaging systems. For example, email-borne malware outbreaks have occurred with some frequency, spreading across the globe in a matter of hours, at times. Some degree of protection can be achieved by scanning emails and their attachments for malware while the emails are being conveyed through the network (e.g., the Internet) and/or upon receipt. Typically, the scanning of emails during their transport is done on a centralized basis (e.g., by Internet Service Providers (ISPs) and/or others who operate email gateways). Scanning can also be performed at an end user's machine, upon the receipt of a given email and prior to storage thereof (and ultimately, access thereto by the intended recipient).

However, even with the scanning of emails during transport and upon receipt, there is still a problem with regard to new malware. For example, it is possible for new malware to be released onto the Internet, and begin infecting computers before a new malware definition (containing information allowing identification of the new malware) can be promulgated. In such a scenario, a given email message may contain the new malware, which would then go undetected as the given email message (and new malware) was conveyed to the intended recipient, regardless of having been scanned during transport and upon receipt (as a result of the (old) malware definition being used). Thus, there exists a window of vulnerability in such messaging systems, in which the period of time between when the last malware definition was made available, and a new such malware definition is made available. In such scenarios, then, messaging systems lack protection from new malware introduced during such periods. Thus, even leaving aside the question of how a new virus might first be detected, and whether or not the given message was scanned during transport or receipt with a given malware definition, there remains the need for functionality that protects messaging systems in such situations.

SUMMARY

The present disclosure describes methods, computer program products, computer systems, and the like that provide for detecting an occurrence of an event, in response to the detecting the occurrence of the event, scanning a message. The occurrence of the event indicates that the message should be scanned. The message includes recipient information, which identifies a recipient of the message, and is stored in a message store. The message has been received at a message destination associated with the recipient. The scanning uses a malware definition. The scanning is performed prior to the message being retrieved from the message store in response to a request by the recipient to retrieve the message from the message store. The event is other than the request by the recipient to retrieve the message from the message store.

In some embodiments, the scanning includes reading the message from the message store. In other embodiments, determining whether a time period has expired; and, if the time period has expired, determining whether the message should be scanned. In such embodiments, the event can include at least one of the receipt of a new malware definition, the expiration of a time period, or the receipt of the message. Such embodiments may further provide that the determination as to whether the message should be scanned includes determining whether a new malware definition is available from a local cache, and if the new malware definition is available from the local cache, retrieving the new malware definition from the local cache and indicating that the message should be scanned using the new malware definition retrieved from the local cache.

In certain embodiments, the determination as to whether the message should be scanned further includes, if the new malware definition is not available from the local cache, determining whether the new malware definition is available from a server; if the new malware definition is available from the server, obtaining the new malware definition from the server; and indicating that the message should be scanned using the new malware definition from the server, and, if the new malware definition is not available from the server, indicating that the message should not be scanned.

In still other embodiments, the message is one of a number of messages, and the embodiments further include assigning a priority level of a number of priority levels to each message of the messages, determining a scan order in which to scan the messages, and scanning the messages. In such embodiments, the order is based, at least in part, on a priority level of a number of priority levels assigned to each message of the messages, and the messages are scanned using the scan order.

In still other embodiments, the embodiments further include scheduling the scanning to occur at a specified time, where the event is the occurrence of the specified time for the scheduled scan. Such embodiments can include scheduling a number of scheduled scans, where the scheduled scans includes the scanning, and performing certain scheduled scans of the scheduled scans according to a priority level of each of the certain scheduled scans. Such embodiments can further include the scheduling the scheduled scans including scheduling each scheduled scan of the scheduled scans to occur at one of a number of specified times and assigning a priority level to the each scheduled scan of the scheduled scan. The each of the certain scheduled scans are scheduled to be performed at a scheduled time of the scheduled times.

In other embodiments still, the embodiments further include receiving a new malware definition, where the event is the receiving of the new malware definition. Such embodiments can also include receiving the message, where the event is the receiving of the message. Certain embodiments include assigning a priority level of a number of priority levels to each message of a number of messages, where the priority level is based, at least in part, on a reputation of a message destination of the each message of the messages, and scanning the messages, where the scanning uses a malware definition, the scanning scans the messages in a scan order, and the scan order is based on a priority level of the each message of the messages.

In other embodiments still, the embodiments further include assigning a priority level of the priority levels to each message destination of a number of message destinations, where the message destinations include the message destination of the each message of the messages, and the assigning the priority level of the priority levels to the each message destination of the message destinations results in the assigning the priority level of the priority levels to the each message of the messages. In certain ones of such embodiments, the assigning the priority levels to the message destinations includes determining one or more criteria by which to prioritize the message destinations, evaluating each of the message destinations using the one or more criteria, and assigning the each of the message destinations a message destination reputation of a number of message destination reputations. In such embodiments, the message destination reputations include the reputation, and the assigning is based, at least in part, on the evaluating.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of various embodiments, as defined solely by the claims, will become apparent in the non-limiting detailed description set forth below.

BRIEF DESCRIPTION OF THE DRAWINGS

The embodiments described herein may be better understood, and their numerous objects, features and advantages made apparent to those skilled in the art by referencing the accompanying drawings.

DETAILED DESCRIPTION

Introduction

Figure 1:
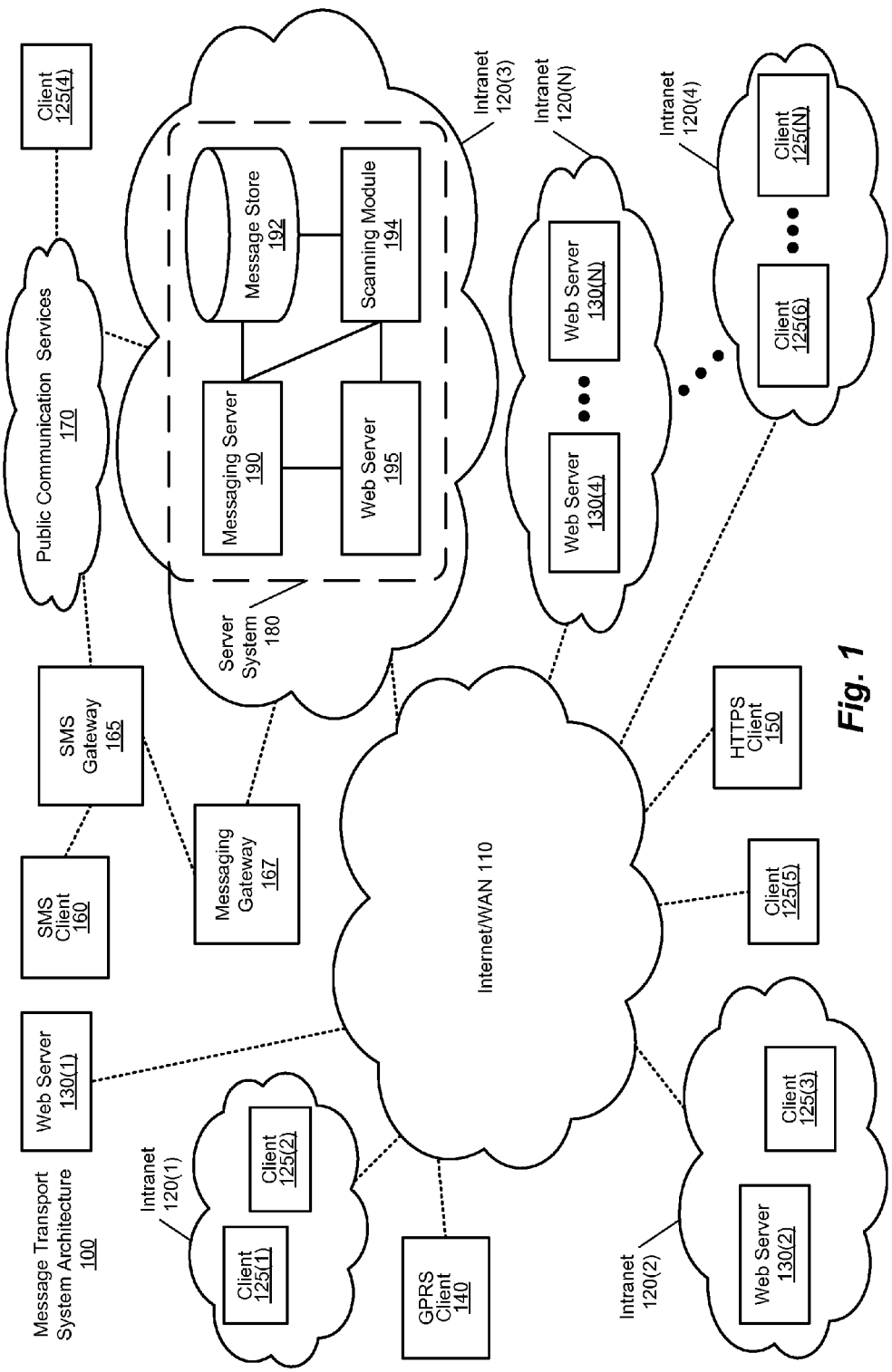
FIG. 1 is a block diagram illustrating an example of a message transport system architecture supporting message scanning according to one embodiment.

In systems in which real-time scanning (scanning of messages upon their being accessed) is not supported or has failed, there is a vulnerability window in which a user may access messages that have yet to be scanned using the latest malware definition, and hence have the potential to result in the infection of the user's computing system and/or those of other users. Embodiments of the systems described herein protect users' computing systems in such situations by addressing such deficiencies.

Embodiments of the present method and apparatus provide for the protection of messages in a messaging system (e.g., emails), providing a level of protection comparable to that provided by real-time scanning of messages (in which messages are scanned upon being retrieved (also referred to as being accessed or "read") by a user). Further, systems such as those described herein address the need for efficiently scanning messages (e.g., emails in an email system) by providing for the identification and scanning of high-risk messages/message destinations prior to the scanning of lower-risk messages/message destinations. Such techniques can be used to improve the protection provided by the manual scanning of messages, and the automated scanning of messages, as well, using an historical-based risk assessment approach, for example. Further still, an estimation of the risk to which one or more message destinations might be exposed can be determined by analyzing the messaging communications that occur between such message destinations, using graph-based clustering techniques.

The aforementioned techniques can be employed to good effect in email systems, for example. More specifically, certain email systems lack support for real-time scanning (or may, in certain situations, suffer failures which render such support unavailable), such that a message stored in a message store is not scanned upon retrieval from the message store by a recipient to whom the message is addressed (as would otherwise be the case, were real-time scanning of messages supported). To address such scenarios, scanning can be provided via, for example, an existing interface to a messaging system (e.g., an Application Programming Interfaces (API) configured to allow access to stored messages), a newly-constructed API, or some other comparable mechanism. Such access, once configured, can be accessed by modules (e.g., what are referred to herein as "plug-ins") designed to provide the requisite functionality. Using an approach according to embodiments described herein, such modules can be used as a plug-in into an email system's mail store in order to provide scanning prior to a user accessing a given piece of email. Such an arrangement minimizes vulnerability to malware attacks, in which a message containing malware might be accessed by a user prior to the message having been scanned using the latest malware definition.

With regard to the scanning of messages (whether during the aforementioned vulnerability window or otherwise), it will be appreciated that message scanning (e.g., the manual scanning of emails in email systems) is presently a slow affair, particularly when performed in a serial fashion (as is typically the case in manual scanning). This approach is both inefficient and potentially less effective in protecting a given user. There is thus a need for improved scanning of email mailboxes that provides improved efficiency and greater effectiveness when performing such scanning, such that the risk to a given user is reduced. One way of addressing such needs is to performs scans of high-risk mailboxes prior to mailboxes which have shown a generally lower risk of infection (e.g., based on a determination as to whether the mailbox in question was subject to attacks in the past). Further, manual scans currently take a long time to complete. In addressing the aforementioned challenges, a system according to one embodiment addresses the obstacles caused by such long completion times by giving higher priority to the scanning of mailboxes determined to be at a higher risk of infection.

Embodiments of the systems described herein provide a method and apparatus that offer continuous protection of messaging systems and address the risks associated with the aforementioned vulnerability window, as well as allow a system according to such embodiments to address certain other of the existing needs by focusing malware scanning on higher-priority message destinations. In an email system according to embodiments of the systems described herein, a scheduled scanning operation is performed on a mail store, which is triggered based on a malware definition being updated. This scanning operation scans the messages that have been delivered into the mailbox during a preceding period of time (e.g., in the past 24 hours, though this time window is configurable by the user as per the requirements of the situation at hand). As a result, emails already delivered (and so, already stored in the mail store) are scanned using the latest malware definitions. In certain embodiments, this scanning of emails is performed before the user accesses those emails by way of preventing access thereto until a specified point in time. This scanning operation is preferably, though not necessarily, made available with the given email product in question, and can be enabled/disabled by the end-user. In certain embodiments, emails that have already been scanned using the latest definitions are skipped, in order to enhance efficiency. For example, newer emails, delivered after the receipt of new malware definition information (and thus, while the scheduled scan is being performed), can be skipped, as such emails will be presumed to have already been scanned with the latest definitions during transport.

Further, certain embodiments of the systems described herein identify the reputation of one or more message destinations (e.g., mailboxes), in order to enhance the performance of scanning operations by providing information that allows the scanning of mailboxes to be prioritized. In one embodiment, such a system provides for the generation of reputation statistics over time. Such reputation statistics can be calculated, for example, based on characteristics such as the following:

1. Number of antivirus violations during some period of time
2. Number of file filtering violations during some period of time
3. Number of content filtering violations during some period of time
4. Number of emails received since last manual scan:
    a. Emails from external sources
        (which are given a high priority; this assumes that the risk of an infection is high from external sources)
    b. Emails from internal sources
        (which are given a low priority; this assumes that risk of an infection is low from internal sources)

Using the values observed for such characteristics, a given mailbox can be "scored" and its reputation calculated. Once such a reputation is calculated for the mailboxes in questions, such information can then be used to prioritize the scanning of those mailboxes (e.g., for use in manual scanning)

At this juncture, it should be noted that the discussions of malicious software in certain quarters use the term "malware" in a narrow sense as relating to software having particular characteristics, for example, in terms of propagation, the possibly of multiplication, and the effects thereof, in a manner distinct from other forms of malicious software such as a "virus," "Trojan horse," "worm," and other such malicious software. However, in the present specification, including the appended claims, the term malware is used in a generic sense, to refer generally to any software which by malice or accident causes or might cause undesired effects.

Example Messaging Architectures Supporting Message Scanning

FIG. 1 is a block diagram illustrating an example of a message transport system architecture supporting the scanning of messages according to one embodiment. FIG. 1 depicts a message transport system architecture 100 that includes an internetwork (depicted in FIG. 1 as an internet/wide area network (WAN) 110), which couples a number of intranets to one another (depicted in FIG. 1 as intranets 120(1)-(N)). Intranets 120(1)-(N), in turn, can include a number of components, such as one or more clients (depicted in FIG. 1 as clients 125(1)-(N)) and/or web servers (depicted in FIG. 1 as web servers 130(1)-(N)). Clients 125(1)-(N) and/or web servers 130(1)-(N) can, for example, be implemented as computer systems such as those described in connection with FIGS. 17 and 18. Internet/WAN 110 thus communicatively couples intranets 120(1)-(N) to one another, thereby allowing clients 125(1)-(N) and web servers 130(1)-(N) to communicate with one another (and can, in certain embodiments, provide for the servers of intranets 120(3) and 120(N), for example, to act as cloud-based server systems). As is depicted in FIG. 1, clients 125(1)-(N) can be communicatively coupled to one another and to web servers 130(1)-(N) as part of one of intranets 120(1)-(N), or directly via internet/WAN 110. Similarly, web servers 130(1)-(N) can be coupled via intranet/WAN 110 via a direct connection to intranet/WAN 110, or as part of one of intranets 120(1)-(N).

Message transport system architecture 100 also provides for communication via intranet/WAN 110 using one or more other devices. Such devices can include, for example, a general packet radio service (GPRS) client 140 (e.g., a "smart phone" or comparable mobile device), a secure web client (depicted in FIG. 1 as a secure hypertext transfer protocol (HTTPS) client 150), and a cellular phone using standard texting protocols (depicted in FIG. 1 as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with messaging functionality according to one embodiment in a mobile environment. As is also depicted in FIG. 1, SMS client 160 can communicate via internet/WAN 110 via several channels. SMS client 160 can communicate directly, for example, with an SMS gateway 165, which, in turn, communicates with internet/WAN 110 via a messaging gateway 167 and, optionally, elements within intranet 120(3), for example. Alternatively, SMS client 160 can, via SMS gateway 165, communicate with intranet 120(3) (and so, internet/WAN 110) via public messaging services 170 to which SMS gateway 165 and intranet 120(3) are connected.

As is also depicted in FIG. 1, a client 125(4) is also able to communicate via internet/WAN 110 by way of public messaging services 170 and intranet 120(3). In order to support such communications, as well as other communications according to one embodiment, intranet 120(3) includes a server system 180, as well as providing for a number of clients (now shown), in the manner of intranet 120(2). Server system 180 includes a number of elements that allow server system 180 to support messaging communications according to one embodiment. Among these elements are a web server 185 (implemented in hardware and/or software), hardware and/or software configured to facilitate the sending and receiving of messages (represented in FIG. 1 by a messaging server 190), hardware and/or software configured to provide message storage (represented in FIG. 1 by a message store 192), and hardware and/or software configured to provide message scanning functionality (represented in FIG. 1 by a scanning module 194), among other possible such servers and modules, in communication with one another (e.g., directly, via various application programming interfaces (APIs) and/or other such interfaces, and/or other such mechanisms and/or constructs). Various configurations of the elements of server system 180 are discussed in greater detail, for example, in connection with FIGS. 2 and 3. It will also be appreciated that, in light of the present disclosure, message store 192 can be implemented using any manner of computer-readable storage medium, as described subsequently herein.

It will be appreciated that, in light of the present disclosure, the variable identifier "N" is used in several instances in various of the figures herein to more simply designate the final element of a series of related or similar elements (e.g., intranets 120(1)-(N), clients 125(1)-(N), and web servers 130(1)-(N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Figure 2:
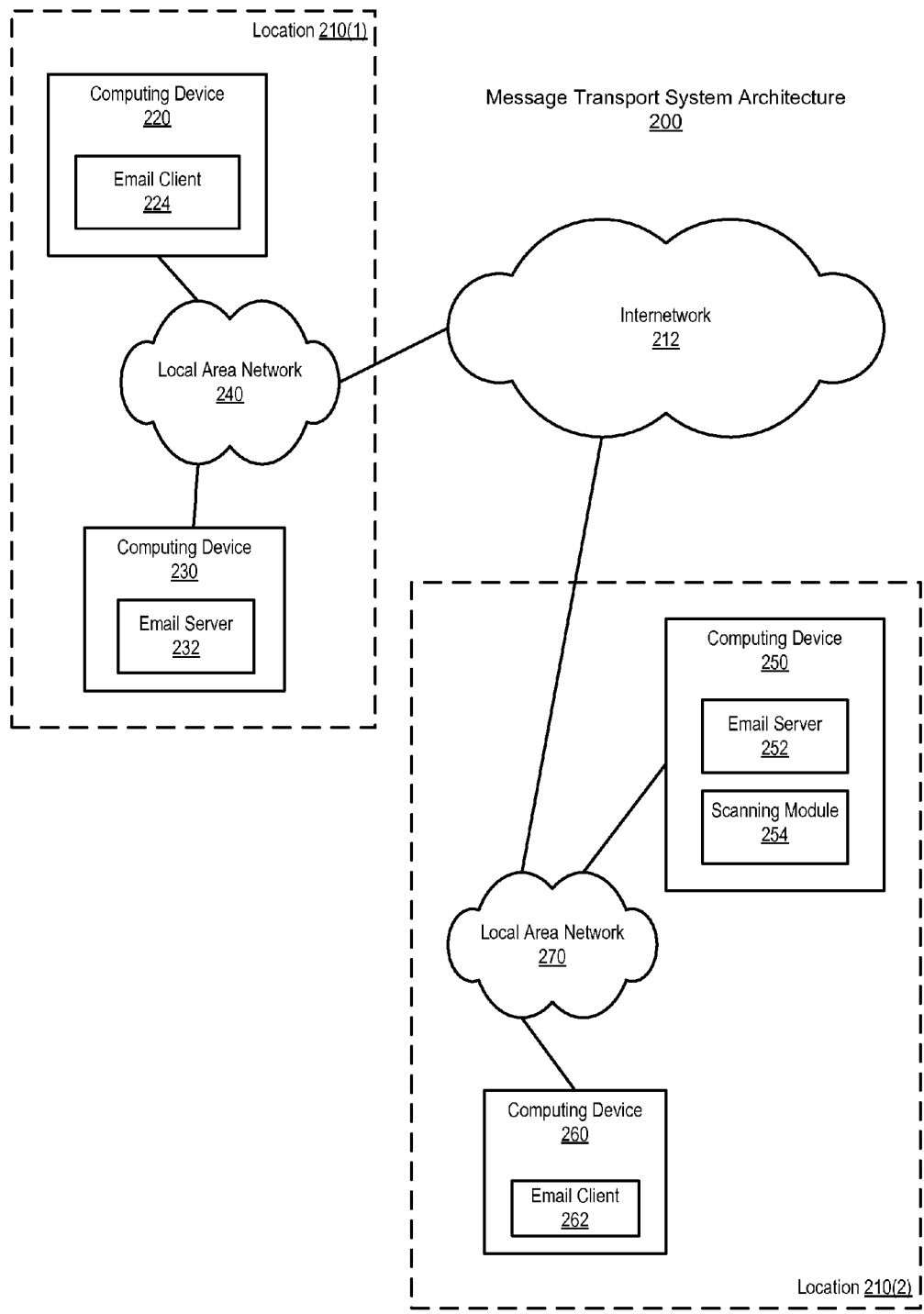
FIG. 2 is a block diagram of a messaging system supporting messaging communications (e.g., using email), according to one embodiment.

FIG. 2 illustrates an example of a message transport system architecture 200, in which email messages are analyzed to prevent users from the untoward effects of malware. In this example, two locations 210(1) and 210(2) communicate via email messages communicated over an internetwork 212. Location 210(1) includes a computing device 220, which, in turn, supports an email client 224, and a computing device 230, which includes an email server 232. Computing devices 220 and 230 are coupled to communicate with one another via a local area network (LAN) 240. LAN 240 also provides a connection to internetwork 212. Similarly, location 210(2) includes a computing device 250, which supports an email server 252 and a scanning module 254. Location 210(2) also includes a computing device 260. Computing device 260, in turn, supports an email client 262, among other possible applications and/or their associated modules. Computing devices 250 and 260 are coupled to communicate with one another via a LAN 270, which also provides a connection to internetwork 212. Computing devices 220, 230, 250, and 260 can each be one (or more) of a variety of different computing devices, including desktop computer systems, laptop computers, cell phones, PDAs (Personal Digital Assistants), multiprocessor server systems, and the like.

In this example, location 210(1) represents the location of the sender of one or more messages (e.g., an email sender), and location 210(2) represents the recipient of such message(s) (e.g., the location of an email recipient). Scanning module 254 generically represents an implementation of scanning module 194 of FIG. 1 in an email environment, and can be implemented in software (e.g., an application, plug-in, applet, object, routine, subroutine, function, program, library, or the like) and/or hardware (e.g., a general purpose processor, a field-programmable gate array (FPGA), a gate array, a custom integrated circuit, or other such hardware). Personnel and computing devices at the sender's location (location 210(1)) provide information to one or more recipients at location 210(2). It is noted that the relationship between locations (as well as the number of locations and the connections between and within locations) can vary among embodiments. Typically, firewalls and other security devices prevent users at location 210(1) from accessing computing devices and/or data attached to LAN 270 in location 210(2). Similar security devices prevent users at location 210(2) from accessing computing devices and/or data in location 210(1) via LAN 240. Accordingly, access to computing devices and data tends to be restricted to a limited set of users.

In operation, a message (e.g., an email) is composed by a sender at location 210(1) using, for example, a mail user agent (MUA) such as email client 224. Such a message can include, for example, various information, attachments, and/or requests for information, any of which can be in a variety of formats (e.g., text, graphics, and so on), and will include message destination information (also referred to herein as recipient information) regarding the message destination(s) associated with one or more recipients of the message, sufficient to allow the message destination(s) (one or more destinations of the message, such as recipients' mailboxes) to be determined. After the email is composed, the sender uses email client 224 to send the email to the local mail submission agent (MSA) (in this case, email server 232). In an email environment such as message transport system architecture 200, the MUA formats the message in the proper format (e.g., an email format) and uses a protocol such as the Submission Protocol (a profile of the Simple Mail Transfer Protocol (SMTP)) to send the message to email server 232.

Since the email is addressed to the user of email client 262, email server 232 then sends the email to email server 252. To accomplish this task, the MSA (email server 232) analyzes the destination address provided via the SMTP protocol, in order to resolve a domain name to determine the fully qualified domain name of the appropriate mail exchange server in the Domain Name System (DNS). Such mail exchange servers can include, for example, one or more mail transfer agents (MTAs) located in internetwork 212, for example.

The MSA (e.g., email server 232) then sends the email message to the appropriate MTA, which, in turn, forwards the email message to the next MTA (if any), and so on, until the email message is ultimately delivered to the appropriate message delivery agent (MDA) (in this case, email server 252). Email server 232, which is running on computing device 250, receives and stores the email message (delivering the email message to the recipient's mailbox).

The recipient can then, using their MUA (in this case, email client 262), communicate with email server 252 in order to check for and obtain email messages from email server 252. Email client 252, as the MUA of the recipient, can use email protocols such as the Post Office Protocol (POP) or the Internet Message Access Protocol (IMAP) to retrieve messages from the MDA (email server 252).

It is noted that in some embodiments, scanning module 254 need not be running when email messages are received by email server 252, though typically, such will be the case. Further, there will typically be a delay between the time at which email server 252 receives an email, and the time at which a recipient accesses that email using email interface 262, though such need not be the case. As discussed elsewhere herein, embodiments of the systems described herein comprehend scanning module 254 scanning email messages stored at email server 252 prior to their retrieval by the intended recipient(s), in the case in which such email messages have not yet been scanned using a given malware definition (e.g., the latest malware definition promulgated by a source of such malware definitions). As will be apparent in light of the present disclosure (and as discussed in the examples that follow), such scanning can be performed based on certain events (e.g., at regular intervals, upon receipt of the email message(s), upon receipt of new malware definitions, based on user-defined criteria, and the like), at advantageous times, and/or the like. Alternatively (or in combination therewith), recipients can be prevented from retrieving email messages that have yet to be scanned, either strictly or based on one or more appropriate criteria (e.g., the priority of the email message, the recipient's position, analysis of one or more of the email messages, and/or other such criteria). Such restrictions can also be overridden in certain circumstances, as may be deemed appropriate and advisable by persons such as system administrators, executives, officials, and/or other persons of comparable position.

Figure 3:
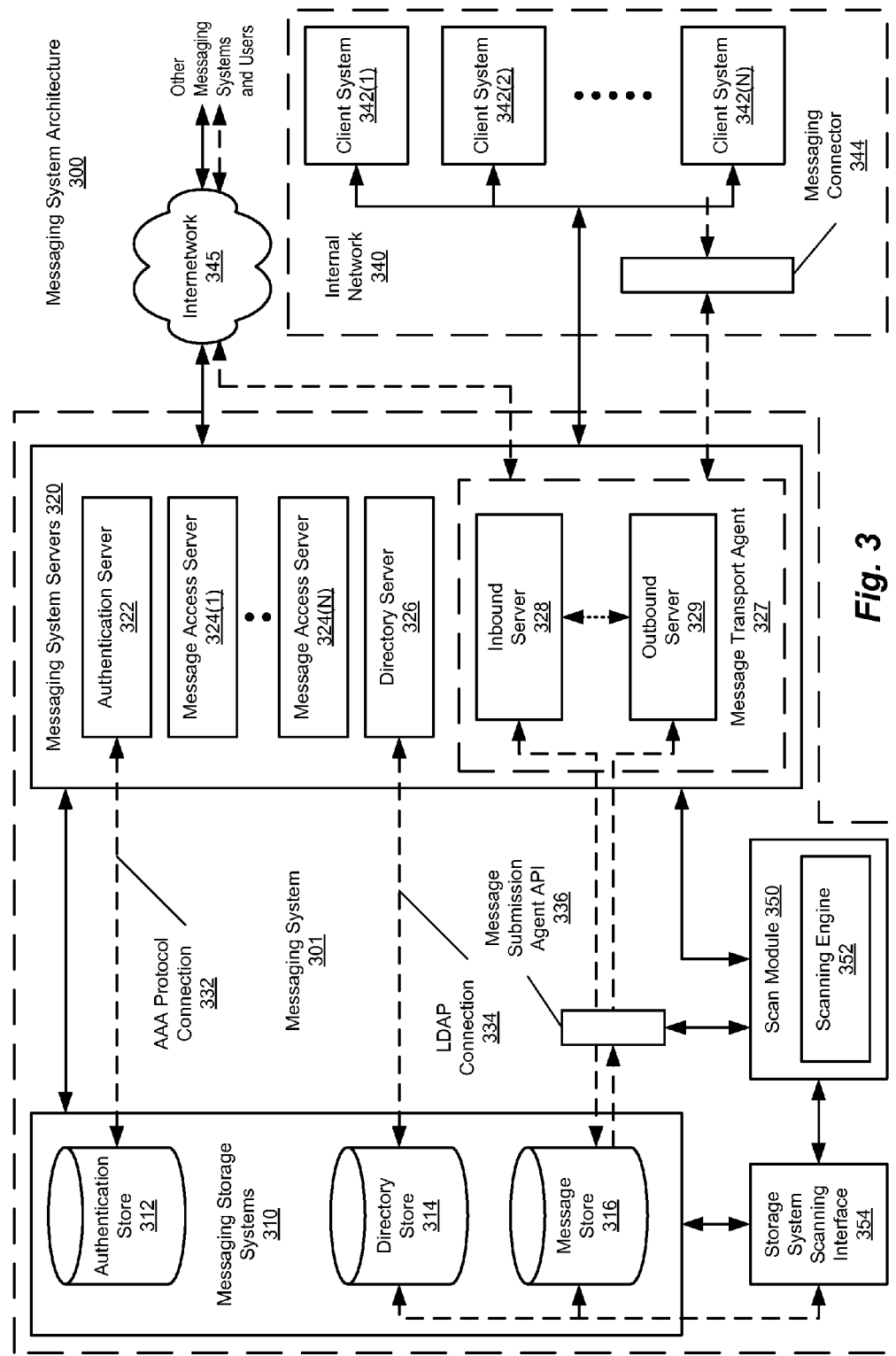
FIG. 3 is a block diagram illustrating an example of a messaging system architecture supporting message scanning according to one embodiment.

FIG. 3 is a block diagram illustrating an example of a messaging system architecture 300, which supports message scanning according to one embodiment. Among other elements, messaging system architecture 300 includes a messaging system 301. Messaging system 301, in turn, includes a number of messaging storage systems (depicted, in the aggregate, as messaging storage systems 310). Among other elements, messaging storage systems 310 can include, for example, authentication store 312, a directory store 314, and a message store 316. As depicted in FIG. 3, messaging system architecture 300 also includes a number of messaging system servers (depicted, in the aggregate, as messaging system servers 320). Messaging storage servers 320 can include, for example, an authentication server 322, a number of message access servers (depicted in FIG. 3 as message access servers 324(1)-(N)), a directory server 326, and a message transport agent 327. In turn, message transport agent 327 can include, for example, an inbound server 328 and an outbound server 329. Message access servers 324(1)-(N) and message transport agent 327 can support one or more messaging protocols, such as, for example, the Post Office Protocol (POP), the Internet Message Access Protocol (IMAP), and/or the Hyper-Text Transfer Protocol (HTTP).

Messaging storage systems 310 and messaging system server 320 are communicatively coupled to one another, and thus support communications necessary to provide for the transport and storage of messages. Communications between messaging storage systems 310 and messaging system servers 320 can be, and often will be, effected in a number of ways. Such communications can include, for example, an authentication/authorization/accounting (AAA) protocol connection 332, which supports communication between authentication server 322 and authentication store 312. In at least certain scenarios, authentication server 322 accesses authentication store 312 to validate login information for a given messaging system user, such that access to and use of the requisite systems and information maintained therein can be managed and controlled.

Communications between storage systems 310 and messaging system servers 320 can also include, for example, a lightweight directory access protocol (LDAP) connection 334 and the use of a Message Submission Agent (MSA) Application Programming Interface (API) (MSAAPI) 336. As depicted, LDAP connection 334 supports communications between directory server 326 and directory store 314, and supports access to and the maintenance of messages in message store 316. In comparable fashion, MSAAPI 336 provides for communications between various components of messaging system architecture 300 and message store 316, including access to (and from) message store 316 by inbound server 328 and outbound server 329 of message transport agent 327.

Also communicatively coupled to messaging system 320 is an internal network 340, which can include, for example, a number of client systems (depicted in FIG. 3 as client systems 342(1)-(N)). Client systems 342(1)-(N) of internal network 340 and messaging system servers 320 communicate with one another via, for example, a messaging connector 344. The access to messaging servers 320 provided to client systems 342(1)-(N) by messaging connector 344 supports functionality needed for messaging therebetween, as well as with external users.

Messaging system servers 320, in addition to other functionalities provided thereby, facilitate the communications of messages between internal network 345 (an example of what is referred to herein as internal communications), as well as other messaging system end-users via, for example, an internetwork 345 (e.g., the Internet; an example of what is referred to herein as external communications). In facilitating the transport and storage of messages in this fashion, messaging system architecture 300 supports security measures such that the transport and storage of the aforementioned messages does not result in unwanted and/or untoward effects for users (e.g., virus infections, spamming, unintended delivery of malware, and the like).

The protection of users and systems when communicating by way of messages can be effected through the use, for example, of a scan module (depicted in FIG. 3 as a scan module 350). Scan module 350 includes mechanisms such as a scanning engine 352, and interfaces with messaging system servers 320. Scan module 350 also interfaces with messaging storage systems 310. Scan module 350 can interface with messaging storage systems 310 by way of one of several methods. For example, scan module 350 can interface with messaging storage systems 310 via messaging submission agent API 326. However, in the case in which no message submission agent API is provided or message submission agent API 326 is damaged for some reason, scan module 350 can interface with messaging storage systems 310 via a storage system scanning interface 354, which can be constructed such that more direct access to directory store 314 and message store 316 is provided, for example.

Figure 4:
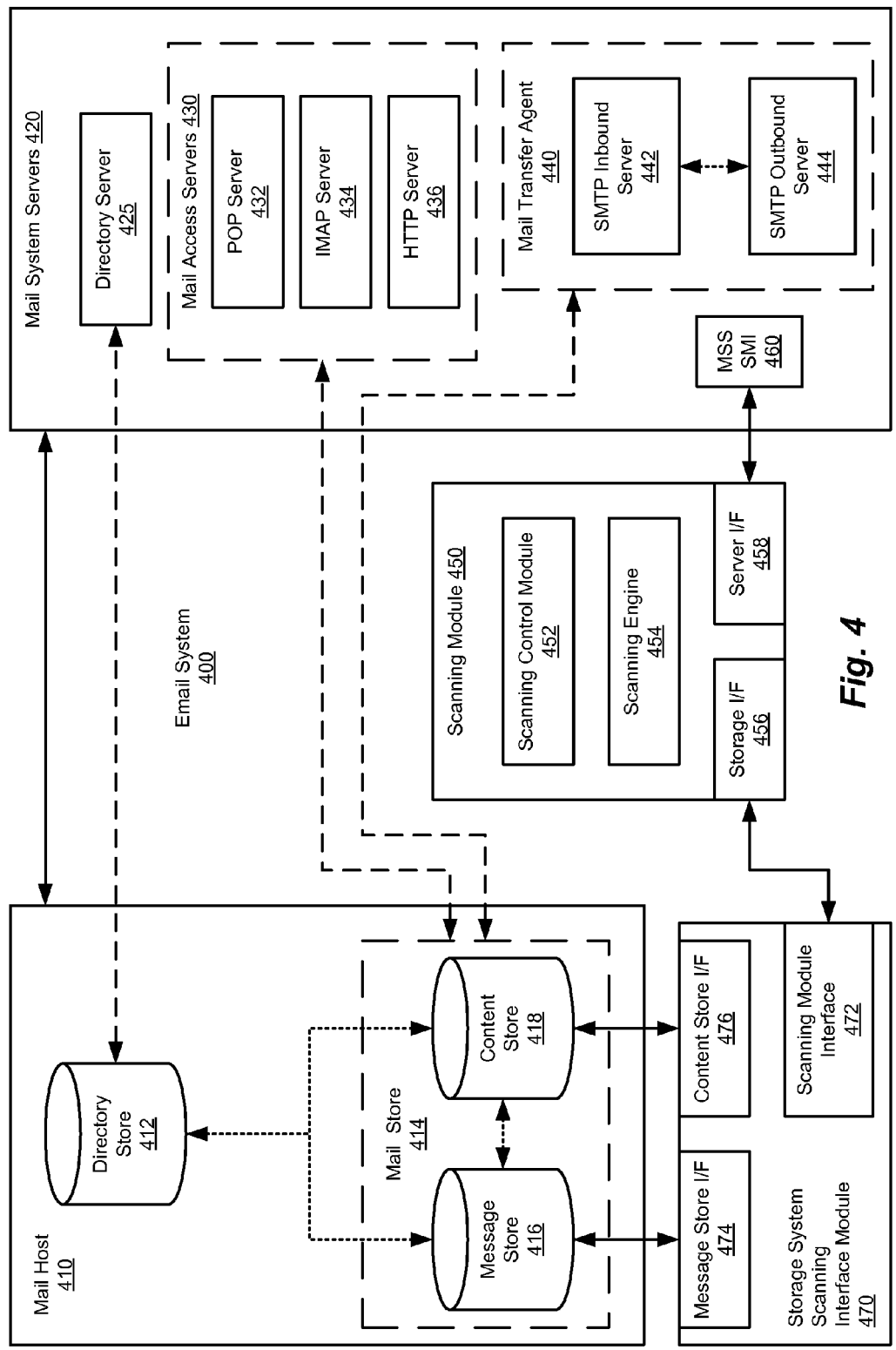
FIG. 4 is a block diagram illustrating an example of an email system architecture supporting message scanning according to one embodiment.

FIG. 4 is a block diagram illustrating an example of an email system architecture that supports scanning of email messages according to one embodiment. In the example depicted in FIG. 4, the email system architecture depicted therein includes an email system 400, which supports communication via electronic mail messages (email messages, or more simply, emails). Thus, email system 400 is depicted in FIG. 4 as including a mail host 410 (comparable in certain respects to certain elements of messaging storage systems 310 of FIG. 3). As depicted, mail host 410 includes a directory store 412 and a mail store 414. In turn, mail store 414 includes a message store 416 and a content store 418. Although information can be stored in mail store 414 in a variety of ways (and, as will be apparent in light of the present disclosure, any of a number of appropriate structure(s) and mechanism(s) can be used in the architecture depicted in FIG. 4 to do so), in the scenario illustrated, message store 416 stores email messages (the "body" of a given email message), while content store 418 stores native content (the "attachments," if any, accompanying a given email message), and is comparable, in at least certain respects, to certain elements of message store 316 of FIG. 3. Information as to the location of and manner in which these email "bodies" and "attachments" can be accessed is maintained in directory store 412.

Email system 400 also includes a number of mail system servers, which are depicted in the aggregate as mail system servers 420 (comparable in certain respects to certain elements of messaging system servers 320 of FIG. 3). Mail system servers 420 include a directory server 425 and mail access servers 430. As alluded to in the discussion of FIG. 4, mail access servers 430 can include, for example, a Post Office Protocol (POP) server 432, an Internet Message Access Protocol (IMAP) server 434, and a Hyper-Text Transfer Protocol (HTTP) server 436. Mail system servers 420 can also include, for example, a mail transfer agent 440. Mail transfer agent 440 can include servers such as a Simple Mail Transfer Protocol (SMTP) inbound server 442 and an SMTP outbound server 444.

As depicted in FIG. 4, email system 400 also includes a scanning module 450 (comparable in certain respects to certain elements of scanning module 350 of FIG. 3). In turn, scanning module 450, includes, for example, a scanning control module 452 and a scanning engine 454. Scanning module 450 interfaces with other elements of email system 400 via one or more interfaces (I/F), such as a storage interface 456 (configured to interface with the elements of mail host 410) and a server interface 458 (configured to interface with the servers within mail system servers 420). To this end, server interface 458 interfaces with a mail system server (MSS) scanning module interface (SMI) 460.

In a similar fashion, storage interface 456 is communicatively coupled to and facilitate communications between scanning module 450 and the various storage elements of mail host 410 via a storage system scanning interface module 470. Storage system scanning interface module 470 (comparable in certain respects to certain elements of storage system scanning interface 354 of FIG. 3) includes a scanning module interface 472, in counterpart to an in communication with storage interface 456 of scanning module 450. Storage system scanning interface module 470 also includes a message store interface 474 and a content store interface 476. As is depicted in FIG. 4, message store interface 474 supports communications with message store 416. Similarly, content store interface 476 supports communication with content store 418. In this manner, scanning module 450 is able to communication with message store 416 and content store 418 of mail store 414 via storage system scanning interface module 470.

Example Message Scanning Processes

Figure 5:
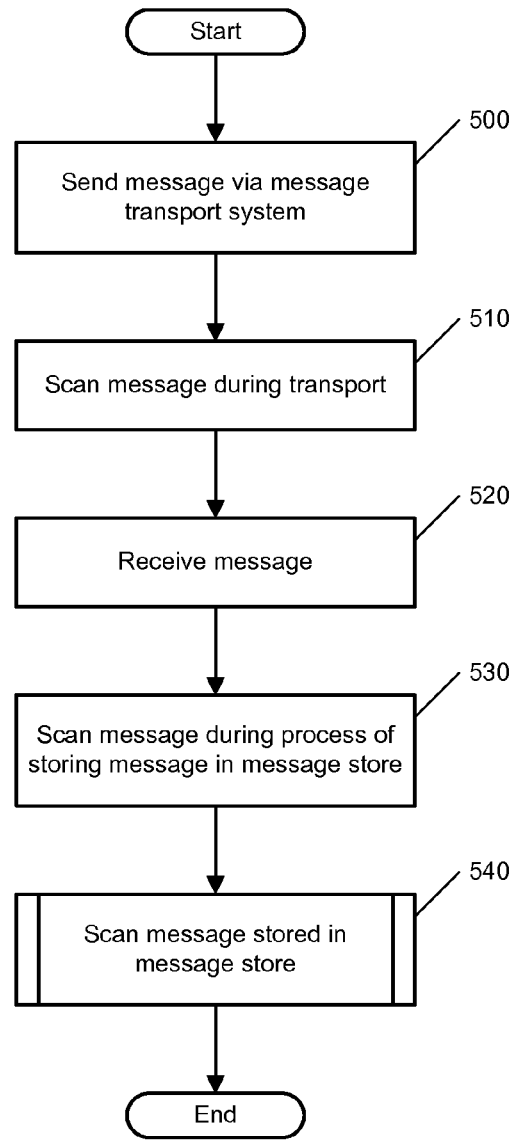
FIG. 5 is a simplified flow diagram illustrating an example of operations performed in scanning a message during its transport and receipt over message transport system architecture, according to one embodiment.

FIG. 5 is a simplified flow diagram illustrating an example of operations performed in scanning a message during its transport and receipt over a message transport system constructed using an architecture according to one embodiment, such as one of the message transport system architectures described previously herein. Thus, as depicted in FIG. 5, a message is transported over a message transport system that includes a messaging system such as messaging system architecture 300. As they are transported, such messages are scanned for viruses and other malware. Such a process begins with the message being sent over the message transport system (e.g., according to a message transport system architecture such as message transport system architecture 100) (step 500). During its transport via the message transport system architecture, the message is scanned for malware at various points (step 510). The message, having been transported over the message transport system (possibly including, e.g., transport via an internetwork such as internetwork 340), is received at the messaging system that is the message's intended destination (step 520).

Once the message is received at the intended messaging system (e.g., messaging system 301), the message is scanned (e.g., by a scan module such as scan module 350) during the process of storing the message (e.g., in a message store such as Message Store 316) (step 530). In systems that support the scanning of messages upon their being accessed by their intended recipients, a scan module such as scan module 350 scans the messages as they are transferred to their intended recipient's via, for example, a mechanism such as message submission agent API 326. However, in cases in which such a message submission agent API fails (at least with regard to the scanning of messages), there is no access to such functionality, or, as depicted in FIG. 4, no such functionality is provided by the messaging system architecture used, an alternative is needed that prevents messages from being delivered to their intended recipient(s) without having been scanned using the latest definition information.

In such scenarios, embodiments of the systems described herein provide for the scanning of messages stored in a message store (e.g., before and/or during such messages' storage in a message store, and/or while such messages are stored in elements such as message store 316, message store 416, content store 418, or other such storage mechanisms). Thus, the process depicted in FIG. 5 provides for scanning the message(s) while such message(s) is (are) stored in such a message store (step 540). Such operations can be accomplished in a number of ways. For example, a scanning module can read the message(s) in question from a storage system via a storage system scanning interface, and perform scanning on the message(s) thus read, in order to identify infected messages. Alternatively, the scanning module could read the message(s) in question from a storage system via a storage system scanning interface, perform scanning on the message(s) thus read (cleaning any messages found to be infected, optionally), and writing the now-scanned (and, optionally, cleaned) message(s) back into the storage system. As will be appreciated, such transformations are intended to come within the scope of this detailed description, as well as the claims appended hereto.

Figure 6:
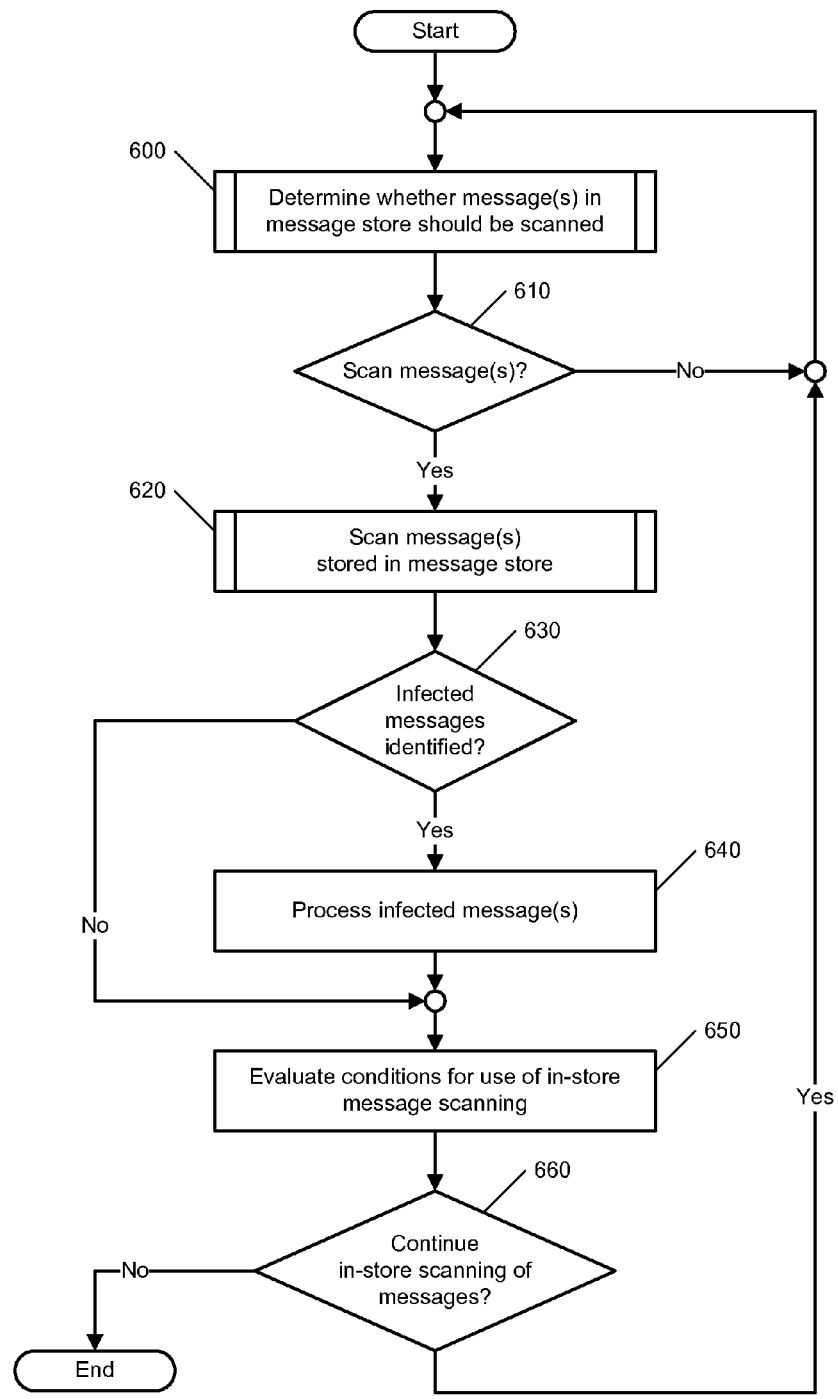
FIG. 6 is a simplified flow diagram illustrating an example of operations performed in scanning messages stored in a message store, according to one embodiment.

FIG. 6 is a simplified flow diagram illustrating an example of operations performed in scanning messages stored in a message store, according to one embodiment. As noted, various embodiments of the systems described herein provide for the scanning of messages stored in a message store (as noted in connection with the description of FIG. 5). Such a process begins with the operations related to making a determination as to whether the message(s) in the message store should be scanned (step 600). While it is possible to simply scan a message store continuously using whatever malware definition(s) is (are) available at the time, doing so will typically be inefficient (and, if the messages being scanned have already been scanned with the given malware definition(s), without any real purpose). To that end, the determination thus made will typically be based on the detection of the occurrence of some event, such as the receipt of a new malware definition, a scheduled point in time being reached, or some other (possibly user-defined) criteria. If the determination thus made indicates that, for whatever reason, a scan of the message(s) in question need not be scanned (step 610; e.g., the messages in question have already been scanned with the latest malware definition), the process loops, and so continues to await messages that are in need of scanning. If a determination is made that one or more messages in the message store should be scanned (step 600), operations related to scanning those message(s) are performed (step 620). If infected messages are identified (step 630), the infected message(s) are processed accordingly (step 640). If no infected messages are identified by the scan performed on the message(s) stored in the message (step 630) or the processing of any infected messages has completed (steps 630 and 640), one or more conditions with regard to the continued use of in-store message scanning are evaluated (step 650). Such conditions can include a determination as to whether the ability to perform scan-on-access scanning of messages has been restored, for example. A determination based on the aforementioned evaluation, is then made as to whether or not to continue in-store scanning of messages (step 660). If in-store scanning of messages is to be continued (step 660), the process loops to the operations that determine whether the given message store contains messages that should be scanned (steps 600 and 610). Otherwise, the process concludes.

Figure 7:
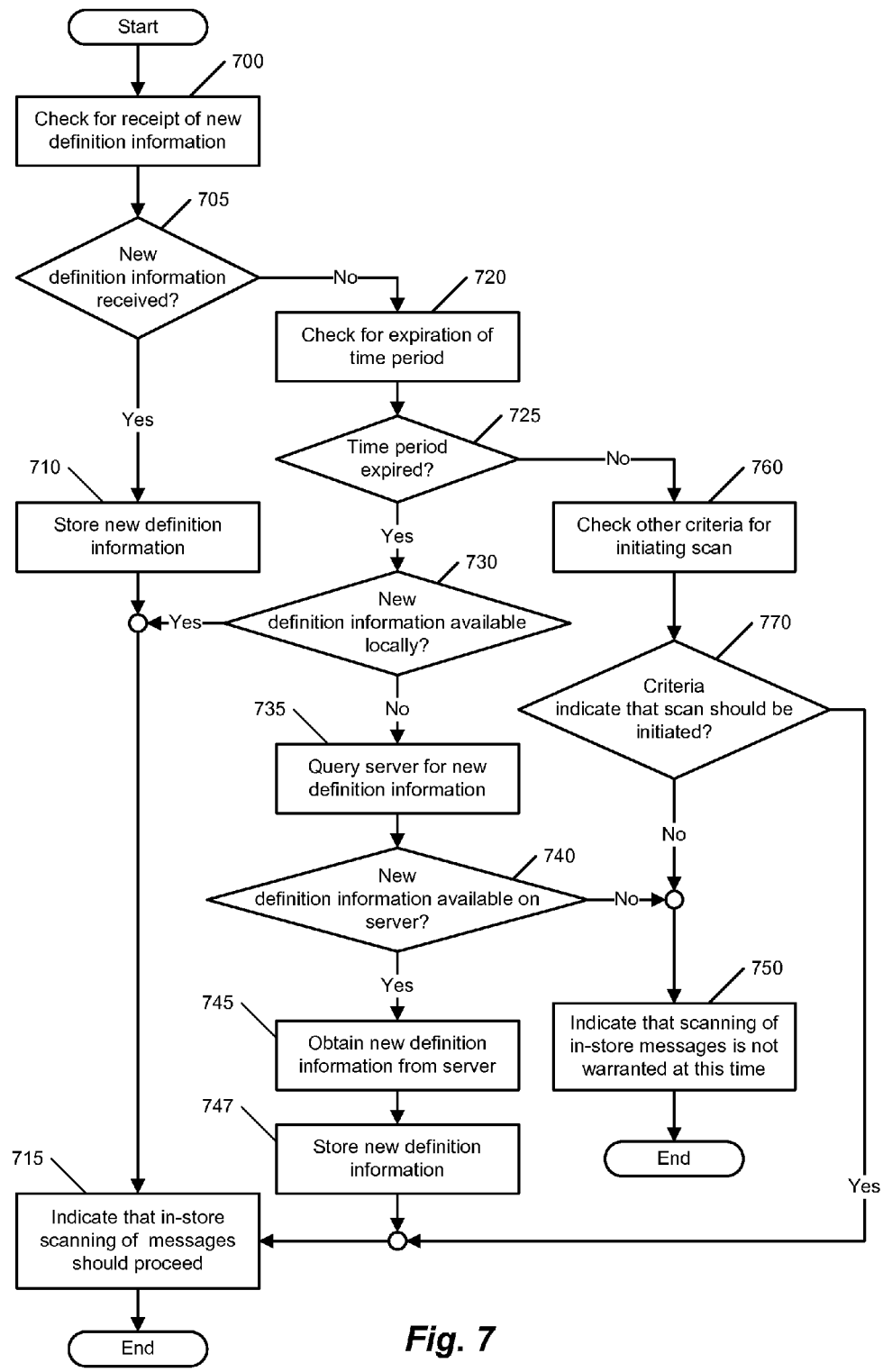
FIG. 7 is a simplified flow diagram illustrating an example of operations performed in determining whether messages in a message store should be scanned, according to one embodiment.

FIG. 7 is a simplified flow diagram illustrating an example of operations performed in determining whether messages in a message store should be scanned, according to one embodiment. The example process of FIG. 7 includes alternatives for scanning messages upon the receipt of new malware definition information, scanning messages based on a schedule, and/or scanning messages based on other criteria (e.g., the number of such messages needing to be scanned). While FIG. 7 depicts certain determinations regarding when scanning is performed and which messages are to be scanned, it will be appreciated that any number of alternatives for making such determinations, as well as other such determinations, will be appreciated in light of the present disclosure. In addition, the process depicted in FIG. 7 also takes into account the possibility of definition information being cached locally or maintained at (or available from) a server.

The process of FIG. 7 begins with a determination as to whether new definition information has been received (step 700). It will be appreciated, in light of the present disclosure, that such an operation can also be performed in response to the receipt of one or more messages (in the alternative or in combination therewith). If new definition information has been received (step 705), the new definition information is stored, for example, by a scanning module under the control of a scanning control module (such as scanning module 450 and scanning control module 452 of FIG. 4) (step 710). As will be appreciated in light of the present disclosure, this new malware definition information (and definition information in general) can be stored within scanning module 450 and/or one of its sub-elements, or in a storage system accessible by a scanning module, for example. Once the new definition information has been stored (step 710), the process of FIG. 7 indicates that the scanning of messages should proceed (step 715).

If new definition information has not been received at that point in time (step 705), a determination is made as to whether a given time period has expired (e.g., that a scheduled scan should be performed) (step 720). If the given time period has expired (step 725), a determination is made (e.g., by the scanning control module of the scanning module) as to whether new definition information is available locally (step 730). Such locally-available definition information can, for example, be "cached" information (and, thus, is stored locally), as opposed to having just been received (steps 700 and 705). If the requisite definition information is available locally (step 730), there is no need to perform any storage operations (as the new definition information is already stored locally), and so the process proceeds to indicate that the in-store scanning of messages should proceed (step 715).

Alternatively, if new definition information is not available locally (step 730), a server to which the scanning module has access (and which is configured to maintain definition information), is queried as to the availability of new definition information therefrom (step 735). If new definition information is available from such a source (step 740), the scanning module obtains this new definition information from the appropriate server (step 745) and stores the definition information thus obtained locally (step 747). Alternatively, if new definition information is not available locally (step 730) and is also not available from a server (step 740), the process indicates that the in-store scanning of messages is not warranted at this time (step 750).

If new definition information has not been received (e.g., by the scanning module), nor is available either locally or remotely, other criteria for initiating the in-store scan of messages can be evaluated (step 760). If such criteria indicate that an in-store scan should be initiated (step 770), the process indicates that in-store scanning of messages should proceed (step 715). However, if such criteria indicate that an in-store scan of messages is not warranted at this time (step 770), an indication is provided that indicates a scanning of in-store messages is not warranted at this time (step 750). Once the aforementioned indications have been provided in an appropriate manner, the process then concludes.

It should also be appreciated that the events described in connection with the process of FIG. 7 that result in scanning being performed can be configured to include the scanning of messages upon their receipt. For example, the process of FIG. 7 can be designed such that the receipt of a message during the process of scanning messages in a message store also results in the scanning of such late-received messages. In this regard, such scanning can take into account various criteria as a way of deciding whether or not to include a given message in the scanning operations being performed (e.g., message priority, recipient(s), time until next scheduled mail store scan, and/or the like). Alternatively (or additionally), such messages can be scanned upon their receipt regardless of whether scanning operations are being performed on messages already stored in the given mail store. For example, if a message is received subsequent to the receipt of a new malware definition, but prior to the scanning of existing messages stored in the mail store, the newly-received message can be scanned notwithstanding (either before or after being stored in the mail store). These foregoing variations and other such alternatives are intended to be (and are) comprehended by the present disclosure.

Figure 8:
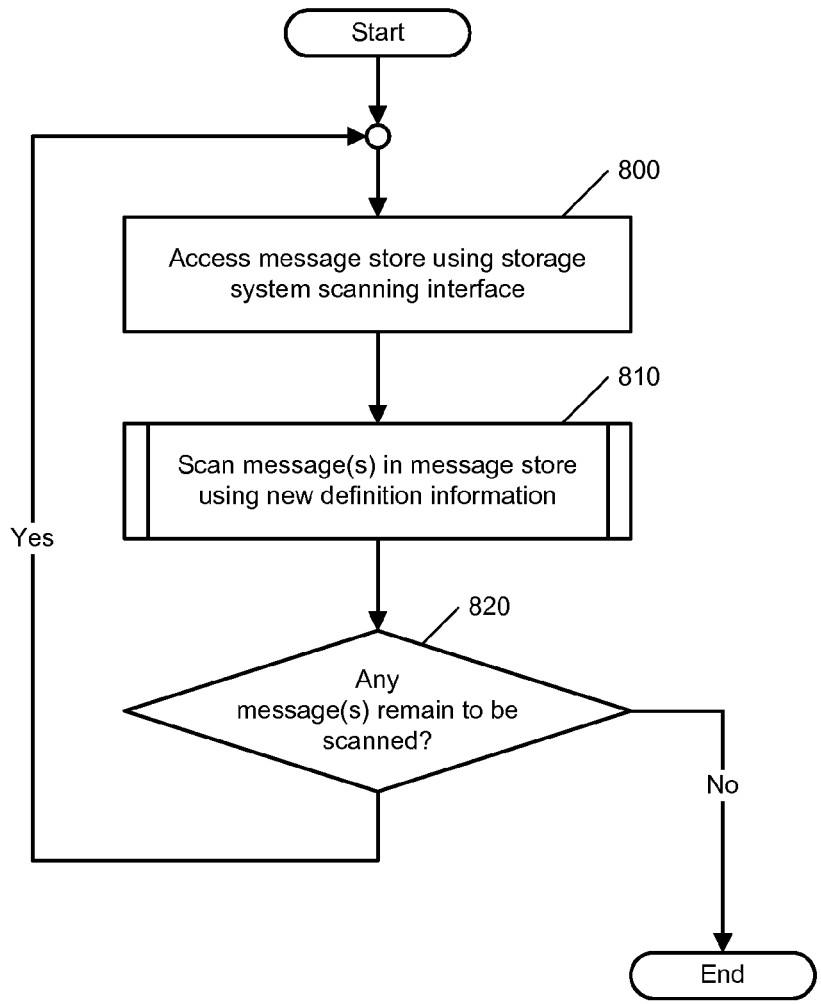
FIG. 8 is a simplified flow diagram illustrating an example of operations performed in scanning messages stored in a message store, according to one embodiment.

FIG. 8 is a simplified flow diagram illustrating an example of operations performed in scanning messages stored in a message store, according to one embodiment. Once a determination is made that one or more messages in the message store should be scanned (e.g., step 600 of FIG. 6, and the operations described with regard to FIG. 7), the process of scanning one or more messages in the message store proceeds. The process of FIG. 8 thus begins with accessing the message store using, for example, a storage system scanning interface, which, as noted, allows a scanning module access to messages, content, directory information, and other such information (step 800). The scanning module then performs operations related to the actual scanning of the given message(s), using the new definition information (step 810). A determination is then made as to whether any messages (or groups of messages) remain to be scanned (step 820). If further messages are in need of scanning (step 820), the process loops back to the accessing of the message store (step 800). Otherwise, the process concludes.

Figure 9:
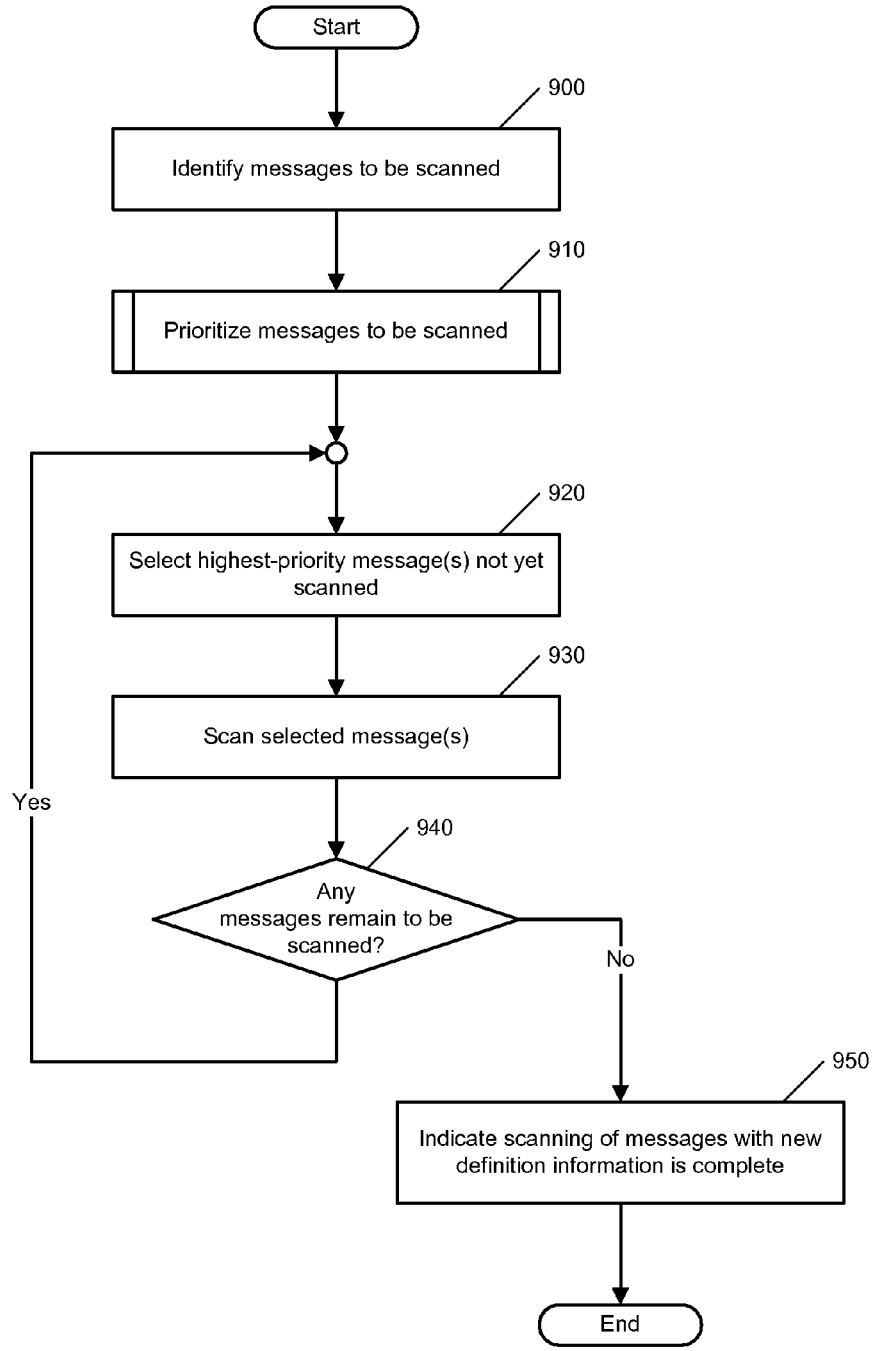
FIG. 9 is a simplified flow diagram illustrating an example of operations performed in scanning messages in a message store using new definition information, according to one embodiment.

FIG. 9 is a simplified flow diagram illustrating an example of operations performed in scanning messages in a message store using new definition information, according to one embodiment. Given that new definition information has been received, in-store scanning of messages can be performed using a number of approaches. The process of FIG. 9 thus begins with identification of the messages to be scanned (step 900). This operation comprehends the actions performed and identifying whether or not a given message or messages is/are to be scanned. Optionally, the messages thus identified can also be subject to operations which prioritize the messages in some fashion, thereby determining an advantageous sequence in which to scan those messages (step 910). Prioritization can be performed in several ways, either separately or in combination. Examples of such techniques are provided below, and are described in connection with the processes depicted in FIGS. 10 and 11, as well as the clustering techniques described in connection with FIGS. 12-16). Once the messages to be to be scanned have been identified (step 900), and, optionally, prioritized (step 910), scanning of those messages not, as yet, scanned is performed using the new definition information. Such scanning is accomplished, for example, by selecting one or more messages to scan, possibly based on the prioritization of the messages performed earlier (step 920), and scanning the messages thus selected (step 930). Such scanning can include scanning the messages "in place" (e.g., reading only those portions needing to be scanned), or retrieving each such message in its entirety (e.g., into a temporary location) in order to allow removal of malware after its identification. A determination is then made as to whether any messages remain to be scanned (e.g., lower priority messages) (step 940). Once the messages identified have been scanned using the new definition information, the process indicates the scanning of the messages is complete (step 950). The process then concludes.

Examples of Reputation in the Prioritization of Message Scanning

As noted, the order in which messages are scanned can be important because, for example, the time required to scan the messages needing to be scanned (e.g., creating a "lag" of 2-4 hours, for example) can create the aforementioned "vulnerability window" while the scanning is in progress. This can lead to a situation in which a recipient accesses one or more messages scanned only with an older malware definition (thus potentially (and inadvertently) accessing a message containing malware). One approach, using the concepts presented herein, is to prioritize messages/message destinations such that the messages/message destinations are scanned in an order (referred to herein as a scan order) that results in more vulnerable messages (e.g., email messages)/ message destinations (e.g., mailboxes) being scanned before less vulnerable messages/message destinations.

The following list provides examples of ways in which vulnerable message destinations can be identified:

Reputation—A message destination reputation can be computed based policy violations associated with the message destination over some period of time. A message destination (e.g., mailbox) with more violations and infections is assigned a lower reputation (indicating that the message destination is more vulnerable to such violations).

Reputation Cluster—A graph (or similar construct) can be created to represent the communication pattern of low-reputation message destinations. A node in the graph thus represents a given message destination. Similarly, an edge can represent how often the one user (represented by a first node) communicates with another (represented by a second node). In one such embodiment, the edge's length is inversely proportional to the frequency of communications between these users. The more the users communicate, the closer the nodes representing the users become. Using this graph, users can be clustered with one another on the basis of their communication pattern. Users with a higher frequency of cross-communication will end up in the same cluster. Message destinations in clusters of low-reputation message destinations can be scanned first. This computation can be performed in conjunction (simultaneously) with message flow, minimizing the overhead required during such message destination scanning.

Vulnerable Recipients—If a violation is found in a message, then other recipients (e.g., other email addresses in the "to:", "cc:", and "bcc:" fields of an email) and sender of the message can be considered as vulnerable, and the scanning of their message destinations given higher scanning priority.

Manual Prioritization—a person such as an administrator can also manually configure critical message destinations (e.g., mailboxes of users/groups that need 24/7 access thereto, and thus need to be given higher scanning priority).

The following passages provide further details regarding the techniques listed above, and the parameters established thereby.

With regard to message destination reputation, the number of policy violations experienced by a given user's message destination indicate the reputation of that message destination. In certain embodiments, both inbound and outbound message traffic can be taken into account in this regard. In such a scenario, inbound message traffic resulting in violations (of whatever type(s)) indicates that the user is receiving the malicious messages, in at least some respect. Conversely, outbound message traffic indicates that the user is sending messages that are malicious. The use of message destination reputation allows message destinations that are more likely to receive (and thus send) malicious messages to be identified.

Some of the characteristics that can be used to account for a low reputation are listed below. Such characteristics are typically monitored over some period of time in order to arrive at a reputation value:

Number of content violations sent or received
Number of malware items sent or received
Number of spam messages sent or received Other parameters can be included in such analyses, as required. Further, the use of such characteristics can be made configurable. Further still, the threshold for each parameter (as to what constitutes a violation) can be configured (e.g., anything >0). In addition the above parameters can be assigned different weights based on the enterprise use-cases and which parameters are deemed of greater (or less) importance.

With regard to message destination reputation, a weighted cluster of mailboxes is created to identify the email communication pattern of message destinations. This allows for the identification of message destinations that are sending or receiving messages from low-reputation message destinations, and are thus more likely to become infected. As noted, each node in the graph represents a given message destination, while the edges therebetween represent the communications between the nodes thus coupled. In certain embodiments, the weight of each edge indicates the frequency of communications between the nodes thus coupled. Thus, the more communications occur between two nodes, the greater the weight of the edge between the nodes becomes. Such a graph allows for the identification of clusters of users with relatively high frequency of communications therebetween. Users with a higher frequency of cross-communication will therefore typically be included in the same cluster. The message destinations in a given cluster are assigned a scanning priority based on the reputation of the cluster. In the manner noted previously, such computations can be performed along with the message flow, thus minimizing overhead during the scanning of message destinations.

With regard to vulnerable recipients, if a violation is detected in a message, then, in additional to the primary recipient of the message (e.g., the first (or only) recipient listed in the "to:" field of an email), other recipients of the message (which can be identified, e.g., by determining any other email addresses in the "to:", "cc:", and "bcc:" fields of the email), as well as the sender of the message (e.g., as listed in the "from:" field of the email), can be considered as vulnerable, and the affected message destination(s) given higher priority for scanning.

Moreover, the scanning of message destinations can take into account the likelihood of a given message destination being accessed during the aforementioned "vulnerability window" by any number of mechanisms. For example, in global organizations, the prioritization of message destinations in this regard can place higher priority on message destinations of users who might be expected to be at work during that period of time (e.g., if a user's "work hours" overlap the vulnerability window, that user's mailbox can be scanned before those of users who are not at work during that time). Similarly, the message destinations of users who require access to their messages around the clock may also be given higher priority. Further still, other techniques, such as statistical methods, historical analyses, and the like, can also be used to good effect in prioritizing message destinations for scanning according to embodiments of the systems described herein. Ultimately, in this regard, it is the question of the likelihood of a given message being accessed by a given recipient that informs the order of message scanning that is to be performed. It will be appreciated that, in light of the present disclosure, the aforementioned techniques, as well as those that will be apparent in light thereof, can also be combined advantageously (e.g., scanning the message destinations of low-reputation message destinations for users who are at work during the scanning process).

Embodiments of the systems described herein also provide mechanisms for improving the efficiency of message scanning, such that the scanning of messages is performed in a manner that is expected to result in a message destination having a relatively higher likelihood of infection being scanned before those having a relatively lower likelihood of infection. That being the case, one example of the order in which messages destinations might be scanned (taking into account the vulnerability of the given message destinations, their likelihood of infection/being accessed, and so on), follows:

1. Scan message destinations assigned the highest priority level (e.g., message destinations of users needing 24/7 access);
2. Scan the low-reputation message destinations;
3. Scan message destinations that communicate with the low reputation message destinations;
4. Scan message destinations of recipients of a message that experiences a violation; and
5. Scan remaining message destinations (e.g., as per priority level assigned by administrator configuration and/or by other means).

Figure 10:
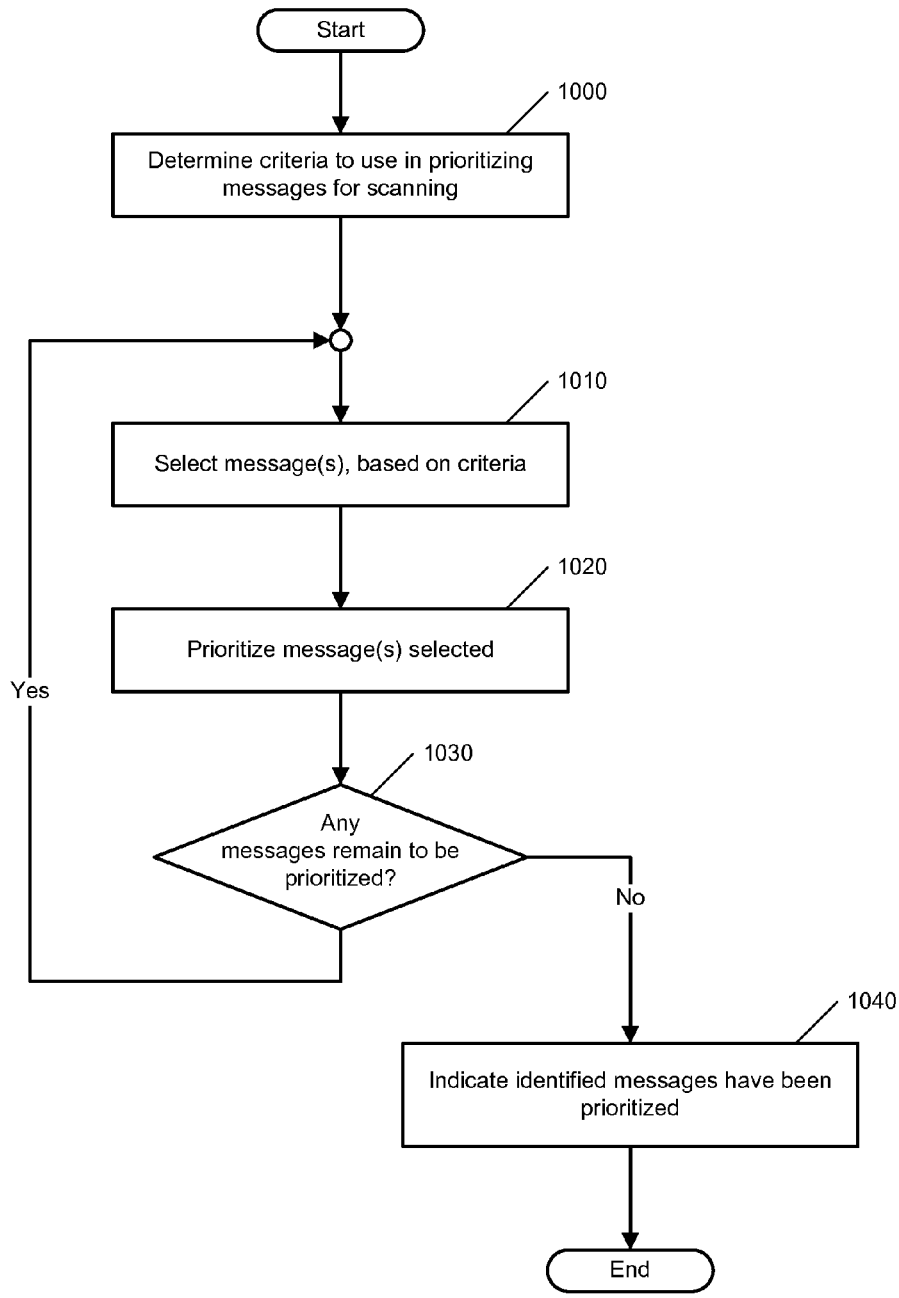
FIG. 10 is a simplified flow diagram illustrating an example of operations performed in prioritizing messages/message destinations to be scanned, according to one embodiment.

FIG. 10 is a simplified flow diagram illustrating an example of operations performed in prioritizing messages/message destinations to be scanned, according to one embodiment. The process depicted in FIG. 10 is an example of the operations that can be performed as part of the process noted in connection with step 910 of FIG. 9. As such, the process of FIG. 10 assumes the messages to be prioritized are those messages stored in the message store in question, which have been identified as those messages to be scanned with the new definition information (e.g., as a result of their having been thus identified, for example, via the operations represented by step 900 of FIG. 9), and so may or may not include all the messages stored therein.

The process of FIG. 10 begins with a determination as to the criteria to be used in prioritizing the one or more identified messages for scanning (step 1000). Once the requisite criteria and/or prioritization algorithms have been selected or otherwise determined (step 1000), one or more messages are selected based on the aforementioned criteria (step 1010). The selected message(s) is/are then prioritized by assigning the selected message(s) the appropriate priority level(s) (step 1020). It will be appreciated that, in light of the present disclosure, the operations performed in the process of FIG. 10 can, for example, select messages to be assigned a given priority level and assign that priority level to them, or evaluate messages on an individual basis and assign each an appropriate priority level based on such evaluation. As will also be appreciated in this regard, message destinations can also be assigned priority levels in a comparable fashion (which, as will be apparent, results in any messages in the message destinations thus prioritized being themselves being assigned the given priority level). As noted above, such selection/evaluation can be based on a number of criteria, with the determination of such criteria being performed either separately or in combination. Further, such techniques can also include the clustering techniques described in connection with FIGS. 12-16. A determination is then made as to whether any messages remain to be prioritized (step 1030). If further messages remain to be prioritized (step 1030), the process loops back to the selection of additional messages based on the aforementioned criteria (step 1010), and the process repeats. Otherwise, an indication is provided that indicates that the identified messages have been prioritized (step 1040).

Figure 11:
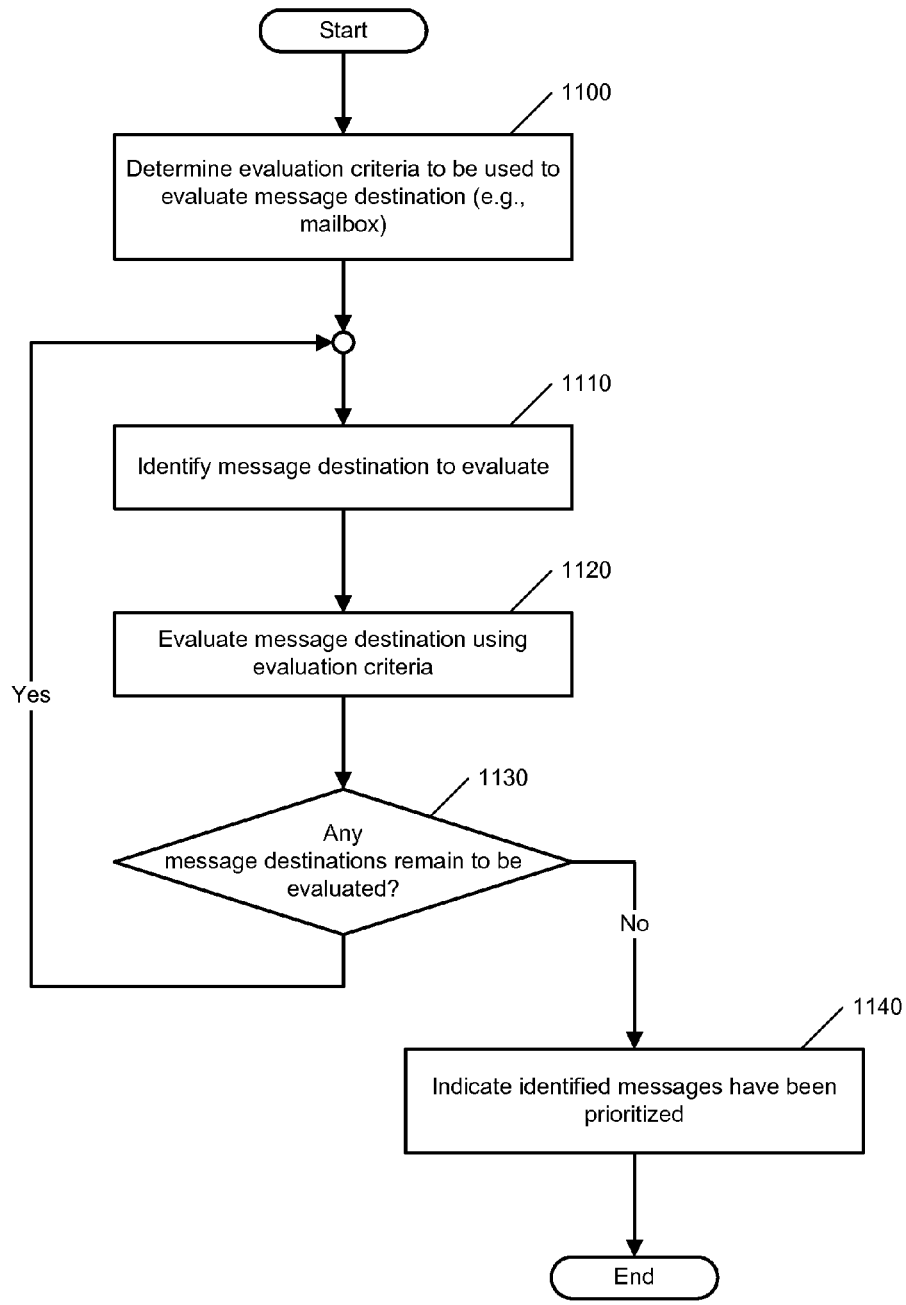
FIG. 11 is a simplified flow diagram illustrating an example of operations performed in evaluating a message destination (e.g., an email mailbox), according to one embodiment.

FIG. 11 is a simplified flow diagram illustrating an example of operations performed in evaluating a message destination (e.g., an email mailbox), according to one embodiment. As part of or in addition to the prioritization of messages to be scanned, messages can be scanned using information gleaned from characteristics of a given message destination. For example, a message destination such as an email mailbox can be ascribed a reputation based on any number of criteria.

Typically, when a scan is begun, message destinations (e.g., mailboxes) are scanned serially. In some scenarios, such serial scanning can take hours to complete, and in so doing, leave a bigger window in which malware can act (e.g., via access by an unsuspecting user) before being detected. The performance of (and thus protection afforded by) such scanning can be improved by prioritizing the scanning of mailboxes through the use of message destination reputation (also referred to herein as trust level). To determine the reputation of a given message destination, a number of factors can be considered, including, but not limited to, past history of violations, the number and source(s) of emails received from outside domains, and the like.

In general terms, the reputation of each mailbox can be determined (e.g., calculated), for example, by summing up the mailbox' various rankings. As will be appreciated in light of the present description, other approaches to such a determination can be used, and are intended to be comprehended by the present disclosure. In any event, each time a violation is detected, the database entries for that particular recipient is updated. The received mails columns is cleared periodically (e.g., after each full (manual) scan). This is done so that, for the next scan, new entries are made. The ranking for each kind of violation can be modified by the user, though it will be appreciated that, for some organizations, content filtering (CF) operations may be more critical than antivirus (AV) protection, making CF operations more critical than that AV operations, or other such operations.

Several kinds of scans can use the aforementioned processes. For example, using these processes, two kinds of manual scans, among others, are possible:

Manual scan of only high risk mailboxes—a database query can be created to obtain the mailbox names of those mail boxes whole reputation is greater than some 'X' value (e.g., in descending order). The manual scan of only these mailboxes can then be performed. As the subset of these mailboxes is comparatively smaller, a manual scan can be performed more quickly.

Prioritized mailbox scanning—a database query can be created to obtain the mailbox names (e.g., in descending order) with respect to reputation and then the manual scanning performed in that order.

Thus, in determining a reputation of a message destination (e.g., mailbox), a determination is made as to whether the evaluation criteria to be used in evaluating the given message destination (step 1100). Once the evaluation criteria have been identified (e.g., selected by a system administrator, identified through the use of artificial intelligence techniques, and/or other such approaches), the process of determining message destination's reputation is begun. Thus, message destinations are identified and evaluated by first identifying a given message destination to evaluate (step 1110). In evaluating the message destination thus identified using the aforementioned evaluation criteria (step 1120). A determination is then made as to whether further message destinations remain to be evaluated (step 1130). If additional message destinations are to be evaluated (step 1130), the process loops to the identification of the next message destination to be evaluated (step 1110) and evaluates that message destination (step 1120), in an iterative fashion. Otherwise, an indication is provided as to the identified messages having been prioritized (step 1140). The process then concludes.

Figure 12:
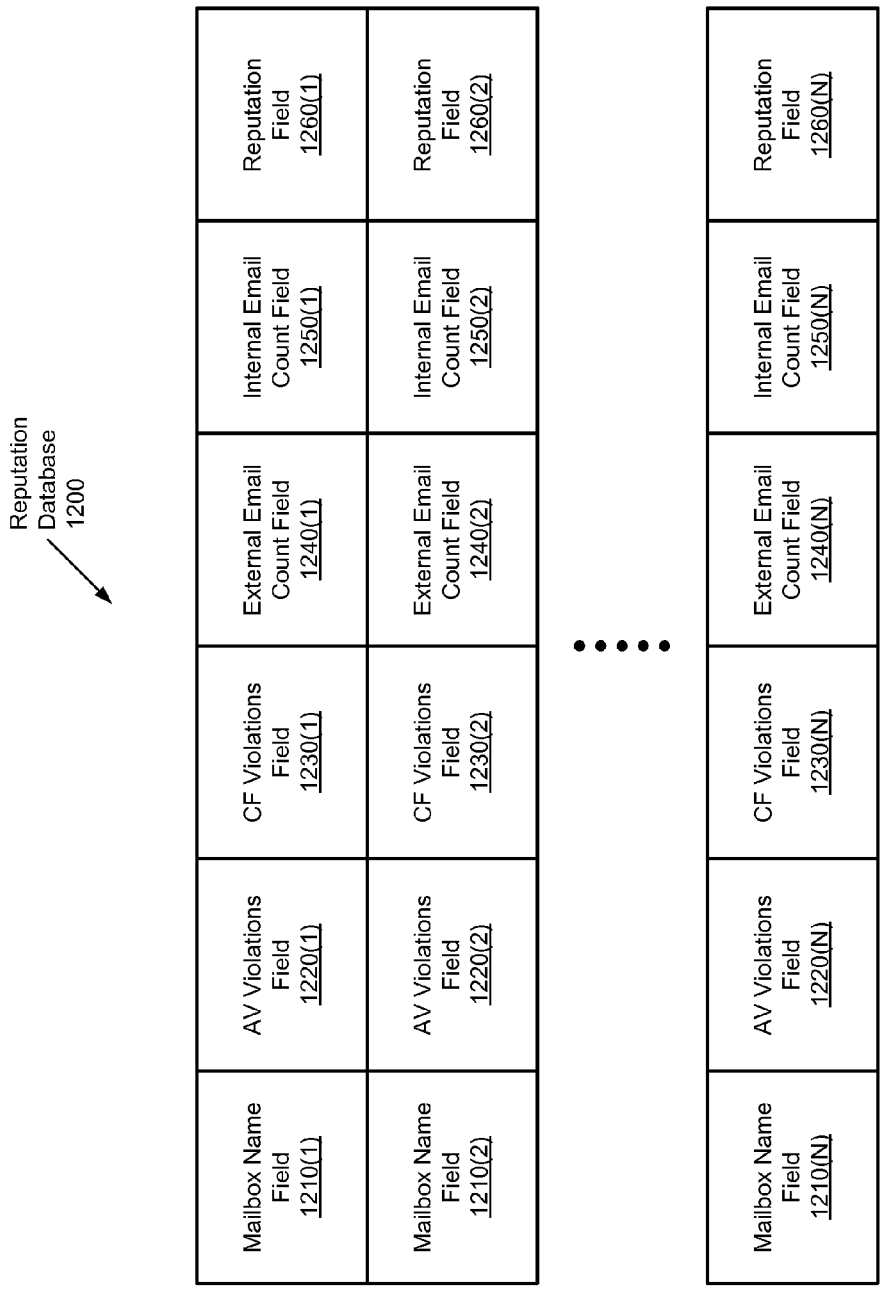
FIG. 12 is a block diagram illustrating an example of a reputation database format, according to one embodiment.

FIG. 12 is a block diagram illustrating an example of a reputation database format, according to one embodiment. A reputation database according to various embodiments can be one of the criteria referred to in the process depicted in FIG. 11, and thus, a messaging system such as messaging system 301 can maintain the requisite information in a reputation database to facilitate the use of reputation information in the scanning of messages. Such a reputation database is depicted in FIG. 12 as a reputation database 1200. In light of such criteria, reputation database 1200 includes a variety of fields for storing information that can be used to facilitate the aggregation and maintenance of reputation information for one or more message destinations (e.g., in the manner depicted in FIG. 12, reputation information for email mailboxes). That being the case, reputation database 1200 includes, for each such message destination, a mailbox name field (depicted in FIG. 12 as mailbox name fields 1210 (1)-(N)), an antivirus (AV) violations field (depicted in FIG. 12 as AV violations fields 1220 (1)-(N)), a content filtering (CF) violations field (depicted in FIG. 12 as CF violations field 1230 (1)-(N) and external email count field (depicted in FIG. 12 as external email count fields 1240 (1)-(N)), an internal email count field (depicted in FIG. 12 as internal email count fields 1250 (1)-(N)), and a reputation field (depicted in FIG. 12 as reputation field 1260 (1)-(N)).

As will be appreciated, mailbox name fields 1210 (1)-(N) are designed to store information regarding the name(s) or other identifier(s) of the mailbox with which the given entry is associated. In certain embodiments, AV violations field 1220 (1)-(N) maintain a count of the number of antivirus violations (e.g., malware identified) that have occurred with regard to the given mailbox. Similarly, CF violations fields 1230 (1)-(N) maintain information regarding the number(s) and/or severity, as well as other information regarding content filtering violations that have occurred with respect to the given mailbox. As will be appreciated, in light of the present disclosure, the antivirus and content filtering violations that occurred, their severity, and other information regarding such violations can all be used to determine the information stored in the field in question, as well as other such information being maintained in additional fields not shown as being part of reputation database 1200. In a similar fashion, external email count fields 1240 (1)-(N) and internal email count fields 1250 (1)-(N) are used to maintain information (e.g., counts) of emails sent to (and/or received from) external destinations (e.g., those outside the recipient's local area network) and internal destinations (e.g., those within the recipient's local area network), respectively. The foregoing information can all be used (or portions thereof), as well as other information (either stored in reputation database 1200 or obtained from other sources), to arrive at a reputation ranking for the given message destination (e.g., the given mailbox). Such reputation information can then be maintained in reputation database 1200 using reputation fields 1260 (1)-(N).

Figure 13:
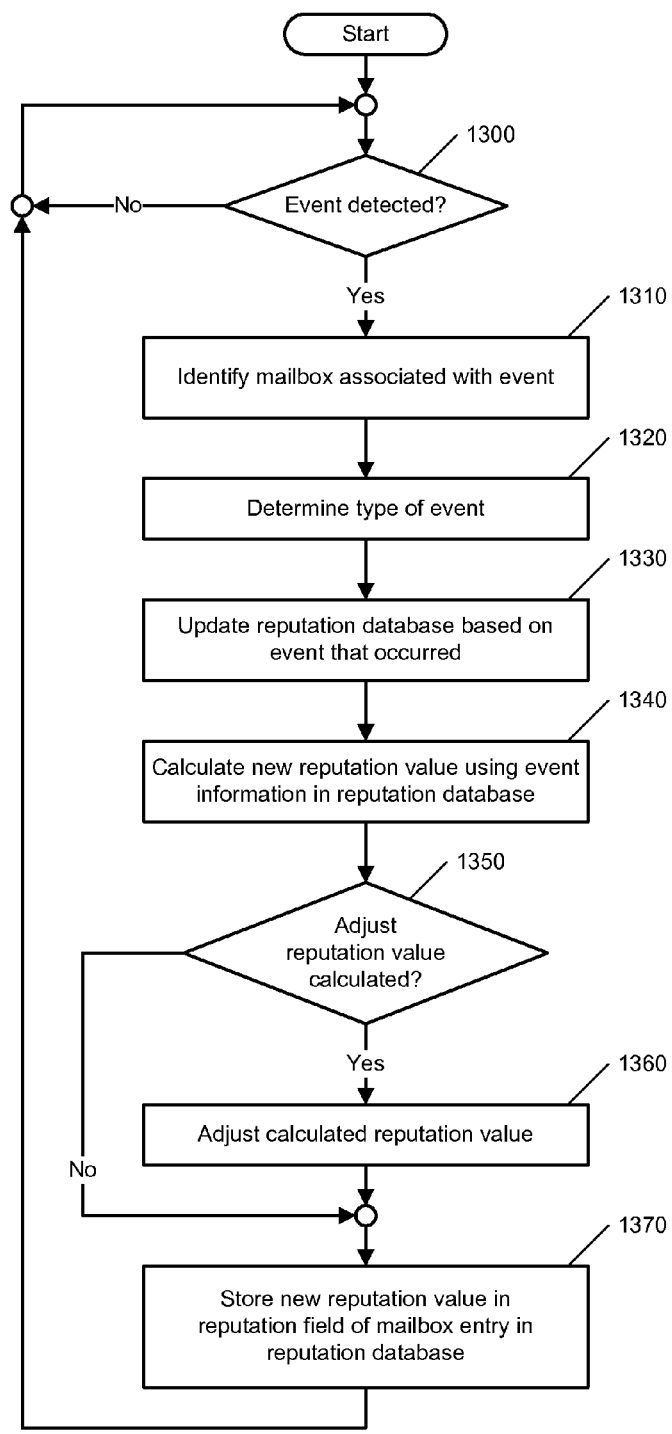
FIG. 13 is a simplified flow diagram illustrating an example of operations performed in maintaining a reputation database, according to one embodiment.

FIG. 13 is a simplified flow diagram illustrating an example of operations performed in maintaining a reputation database, according to one embodiment. A reputation database such as may be the object of such a process can be created using existing reputation information (e.g., an analysis of messages in a mail store, address information of destinations maintained by a given user, and other such existing message traffic information) or can be the result of reputation information aggregated over time (e.g., by observing the relevant information during the operation of the messaging system in question). An example of a process which provides for the maintenance of a reputation database such as reputation database 1200 is thus presented in FIG. 13. In certain embodiments, the maintenance of a reputation database that aggregates information regarding the various message destinations and the given messaging system is based on the occurrence of various events therein (e.g., the receipt and/or sending of messages and/or attachments, the saving of attachments and/or contents, and other such information).

The process of FIG. 13 begins with a determination as to whether an event of interest has been detected (step 1300). While no such events have occurred (step 1300), the process loops, awaiting such individuality. Once an event of interest has been detected (step 1300), the mailbox associated with event is identified (step 1310). Such operations can be performed, for example, by functionality based in the scanning control module of a scanning module, within the male host itself, or by some other mechanism. Once the mailbox has been identified (step 1310), a determination is made as to the type of event which has occurred (step 1320). Based on the event and/or type of event that has occurred (step 1320), the reputation database is updated (step 1330). Information regarding the given mailbox having been thus updated (step 1330), a new reputation value can be calculated using event information stored in the reputation database (including the new information just added) (step 1340). In certain embodiments, an administrator or other use can adjust a given mailbox's reputation value either before or after that reputation value has been calculated based on the updated reputation information. Thus, inquiry is made in the process of FIG. 13 as to whether the reputation value calculated should be adjusted (step 1350). If the calculated reputation value is to be adjusted (step 1350), the calculated reputation value is adjusted as needed (step 1360). Such adjustments can be made, for example, in the case in which filtering is to be performed on the frequency of such events, maxima and/or minima are to be employed, and/or other such processing is to be performed on the information stored in the reputation database. If the calculated reputation value need not be adjusted (step 1350)) or such adjustments have been made (step 1360), the newly calculated reputation value is stored in the reputation field of the mailbox entry in the reputation database (step 1370). The process then returns to awaiting the occurrence of the next event (step 1300).

Creation, Maintenance, and Use of a Reputation Graph for Message Scanning

Figure 14A:
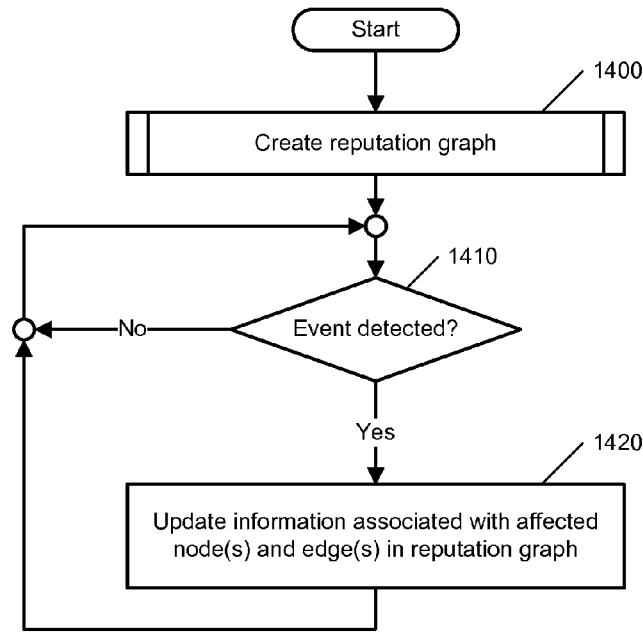
FIG. 14A is a simplified flow diagram illustrating an example of operations performed in creating and maintaining a reputation graph, according to one embodiment.

FIG. 14A is a simplified flow diagram illustrating an example of operations performed in creating and maintaining a reputation graph, according to one embodiment. Rather than dealing with individual message destinations, or even in addition to so doing, message destinations such as mailboxes can be clustered together in groups, in order to facilitate the assigning of a reputation to the mailboxes in that group, as well as simplifying the prioritization of mailboxes for scanning. For example, it will be apparent in light of present disclosure that being able to group mailboxes together for scanning by prioritizing a given group of mailboxes in some certain fashion, makes prioritizing large numbers of mailboxes broken up into such groups a simpler affair. In so doing, the scanning of prioritized mailbox groups (clusters) can be performed as part of scanning numerous messages stored in a message store (e.g., as part of step 620 of FIG. 6).

The process depicted in FIG. 14A provides for the creation and maintenance of cluster information regarding the reputation of message destinations in a messaging system. The process of FIG. 14A begins with the creation of a reputation graph (step 1400). An example of such a graph and its description are provided in connection with FIG. 16. Once a reputation graph is created for the mailboxes in question (step 1400), a determination is made as to whether an event of interest has been detected (step 1410). While no such events have been detected (step 1410), the process loops, waiting for the occurrence of such an event. Upon the detection of an event of interest (step 1410), information associated with the affected node(s) and edge(s) in the reputation graph are updated (step 1420).

Figure 14B:
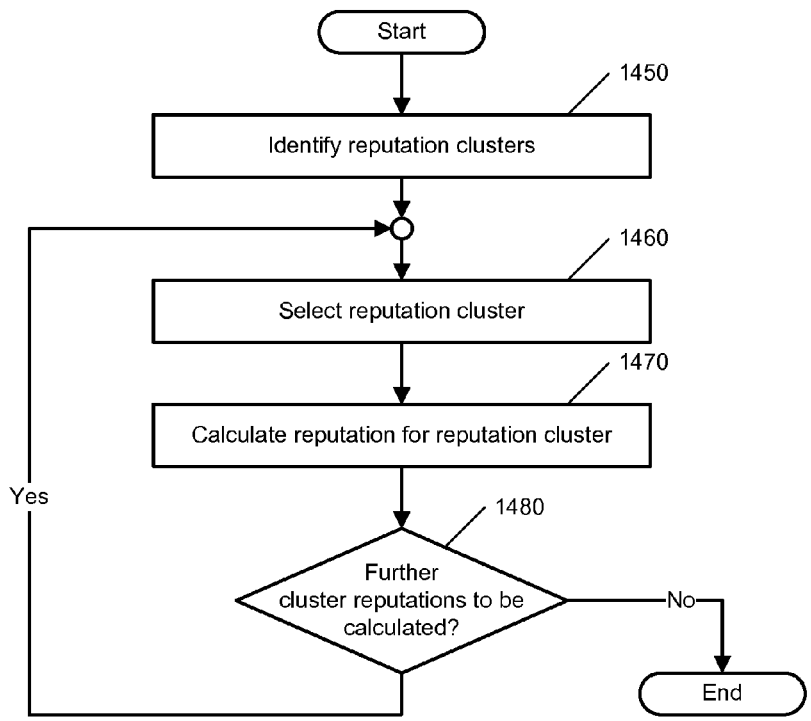
FIG. 14B is a simplified flow diagram illustrating an example of operations performed in using a reputation graph to perform a clustering operation, according to one embodiment.

FIG. 14B is a simplified flow diagram illustrating an example of operations performed in using a reputation graph to perform a clustering operation, according to one embodiment. Once a reputation graph has been created (and maintained), the reputation graph can be used for the identification of reputation clusters among the message destinations (e.g., email mailboxes), which can then be used in the prioritization of those reputation clusters and their message destinations. The process depicted in FIG. 14B begins with the identification of reputation clusters (step 1450). Since the reputation clusters have been identified (step 1450), one of the reputation clusters thus identified can be selected for evaluation (step 1460). Once a given reputation cluster has been selected (step 1460), a reputation value can be calculated for that reputation cluster (step 1470). A determination is then made as to whether further reputation clusters need to have their respective reputation values calculated (step 1480). If additional reputation clusters remain to be evaluated (step 1480), the process loops to the selection of the next reputation cluster to be evaluated (step 1460). Otherwise, the process concludes.

Figure 15A:
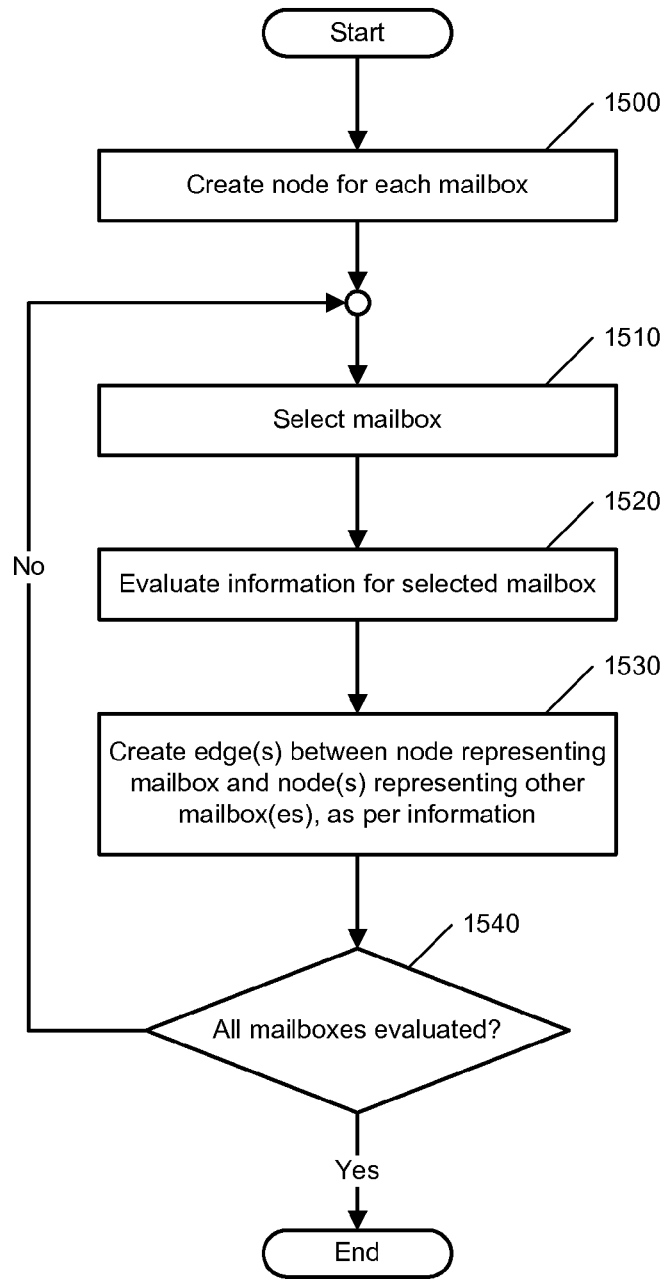
FIG. 15A is a simplified flow diagram illustrating an example of operations performed in creating a reputation graph, according to one embodiment.

FIG. 15A is a simplified flow diagram illustrating an example of operations performed in creating a reputation graph, according to one embodiment. As will be appreciated in light of the present disclosure, the creation of a reputation graph can be accomplished in a number of ways. The process depicted in FIG. 15 depicts one such approach. The process of FIG. 15 begins with the creation of a node n the reputation graph for each message destination to be evaluated using embodiments of the clustering technique described herein (step 1500). Once a node has been created for each of the mailboxes in question (step 1500), one of those mailboxes is selected for evaluation (step 1510). As will be appreciated in light of the present disclosure, the selection of the mailbox involves the selection of the reputation node representing that mailbox in the reputation graph. Information regarding the selected mailbox (including reputation information, sources from which emails have been received, destinations to which emails have been sent, and other such information) is evaluated in order to create the interrelationships between mailboxes that are to be represented by the reputation graph (step 1530). Once the requisite information has been evaluated (step 1520), one or more edges are created between the node representing the mailbox in question and other nodes representing other mailboxes supported by the messaging system, as well as destinations outside the messaging system, if appropriate (step 1530). A determination is then made as to whether all of the mailboxes to be represented by the reputation graph have been evaluated (step 1540). If mailboxes remain to be evaluated (step 1540), the process loops and selects the next mailbox to be evaluated (step 1510). Otherwise, the process concludes.

Figure 15B:
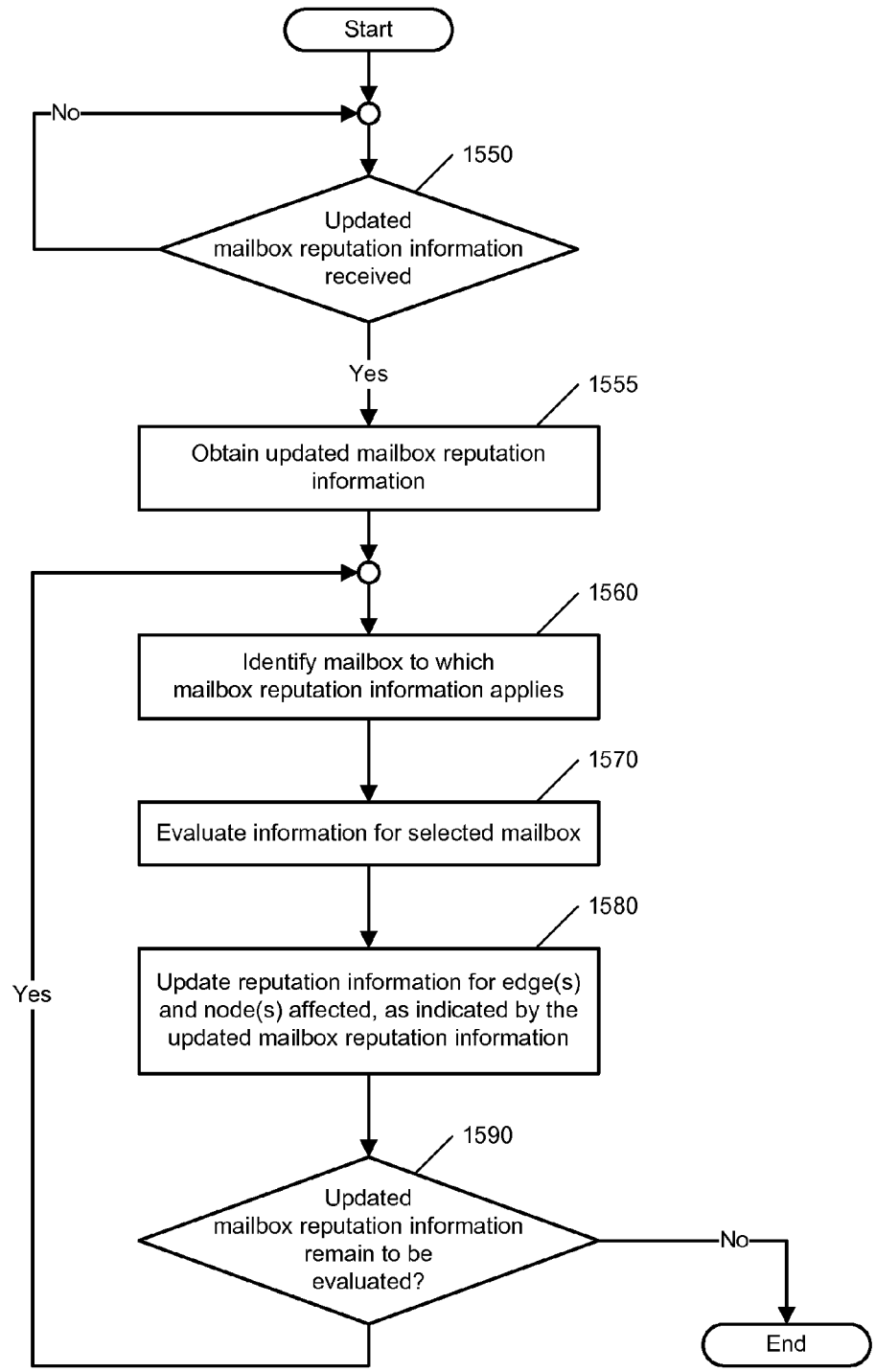
FIG. 15B is a simplified flow diagram illustrating an example of operations performed in updating a reputation graph, according to one embodiment.

FIG. 15B is a simplified flow diagram illustrating an example of operations performed in updating a reputation graph, according to one embodiment. As will be appreciated in light of the present disclosure, the maintenance of a reputation graph can be accomplished in a number of ways. The process depicted in FIG. 15 depicts one such approach. The process of FIG. 15 begins by awaiting the receipt of updated mailbox reputation information (step 1550). Until there is an indication that such updated mailbox reputation information is available (step 1550), the process continues to wait (step 1550). Once an indication is given that updated mailbox reputation information is available (step 1550), the updated mailbox reputation information is obtained (step 1555). Such updated mailbox reputation information can include, for example, information regarding further messages between mailboxes, new infections experienced by one or more mailboxes, sources from which emails have been received, destinations to which emails have been sent, and other such information. After the updated mailbox reputation information has been obtained (step 1555), the mailbox(es) to which the mailbox reputation information pertains are identified (step 1560). As will be appreciated in light of the present disclosure, the identification of the mailbox(es) facilitates the selection of the reputation node(s) and edge(s) representing the mailbox(es) in the reputation graph, as well as their interactions. Once the updated mailbox reputation information has been evaluated (step 1570), the reputation information for the affected edge(s) and node(s) is updated, in the manner indicated by the updated mailbox reputation information (step 1580). A determination is then made as to whether updated mailbox reputation information remains to be evaluated (step 1590). If updated mailbox reputation information remains to be evaluated (step 1590), the process loops and the next mailbox, for which updated mailbox reputation information has been received, is identified (step 1560). Otherwise, the process concludes.

Figure 16:
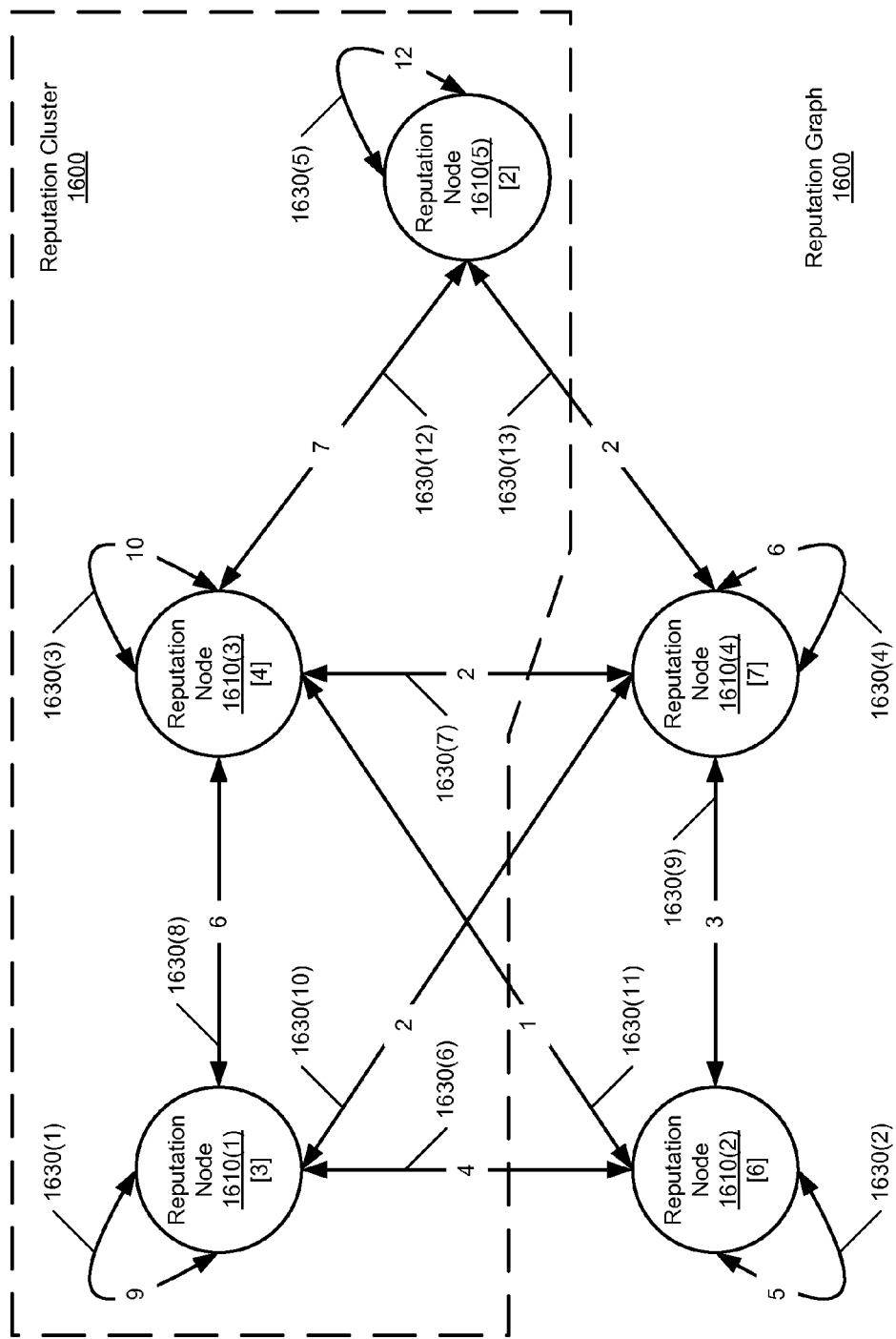
FIG. 16 is a block diagram illustrating an example of a reputation graph, configured according to and for use in embodiments of the systems described herein.

FIG. 16 is a block diagram illustrating an example of a reputation graph, configured according to and for use in embodiments of the systems described herein. As described in connection with FIGS. 14A, 14B, and 15, such processes are designed to create, maintain, and use a reputation graph. An example of such a reputation graph is presented in FIG. 16 (and is depicted in FIG. 16 as a reputation graph 1600). Reputation graph 1600 includes a number of reputation nodes (RNs), each of which represents a message destination such as a mailbox (depicted in FIG. 16 as reputation nodes 1610 (1)-(5)). Having had a process such as that depicted in FIG. 15 performed, reputation graph 1600 also includes a number of reputation graph edges (RGEs), which have associated therewith numeric values representing (in general terms) the relationships between various ones of reputation nodes 1610 (1)-(5). These reputation graph edges (depicted in FIG. 16 as reputation graph edges 1630 (1)-(13)) have associated with each of them information that can be used to determine the relatedness of various of reputation nodes 1610 (1)-(5) with one another. In the example of FIG. 16, these values are depicted as numerical values associated with each of reputation graph edges 1630 (1)-(13). The information presented below in Table 1 reflects these values for each of reputation graph edges 1630 (1)-(13), and so informs the topology thereof and the operations with respect to clustering performed thereon.

TABLE 1

Reputation graph edge values.

| Reputation Graph Edge (RGE) | Value |
|---|---|
| RGE 1630 (1) | 9 |
| RGE 1630 (2) | 5 |
| RGE 1630 (3) | 10 |
| RGE 1630 (4) | 6 |
| RGE 1630 (5) | 12 |
| RGE 1630 (6) | 4 |
| RGE 1630 (7) | 2 |

TABLE 1-continued

Reputation graph edge values.

| Reputation Graph Edge (RGE) | Value |
| --- | --- |
| RGE 1630 (8) | 6 |
| RGE 1630 (9) | 3 |
| RGE 1630 (10) | 2 |
| RGE 1630 (11) | 1 |
| RGE 1630 (12) | 7 |
| RGE 1630 (13) | 2 |

Using a threshold value for creating a reputation cluster of the numerical value 5, the relatedness between any two reputation nodes can be determined by whether the specific one of reputation graph edges 1630 (1)-(13) therebetween has associated therewith a value of 5 or less, or a value of more than five. In the example presented in FIG. 16, it can be seen that certain reputation graph edges (RGE 1630(1), RGE 1630(2), RGE 1630(3), RGE 1630(4), RGE 1630(5)) carry respective values of 9, 5, 10, 6, and 12, respectively, and are self-referential to their respective reputation nodes. Further, these reputation graph edges each have values that are all greater than 5. Inter-node reputation graph edges run between reputation nodes, and have the values indicated in Table 1. It can also be seen that certain reputation graph edges (RGE 1630(6), RGE 1630(7), RGE 1630(10), RGE 1630(11), and RGE 1630(13)) carry respective values of 4, 2, 2, 1, and 2, respectively. Further, these reputation graph edges each have values that are all less than 5. Thus, a reputation cluster (depicted in FIG. 16 as a reputation cluster 1630) can be formed therefrom, and thus include these reputation nodes. Based on this and other information, reputation cluster 1630 can be assigned an appropriate priority. This reputation cluster priority can be used to determine the priority of the reputation nodes for scanning. Further, even if a reputation cluster has been assigned a given priority, the individual reputations of the message destinations within the reputation cluster can be assigned their own priority within the reputation cluster.

In a manner similar to that of the creation of a reputation cluster described above, each message destination of FIG. 16 (as represented by reputation nodes 1610 (1)-(5)) reflects an overall reputation for the given message destination. The reputation for each message destination is depicted in FIG. 16 as a numerical value in brackets. Further to this end, the information presented below in Table 2 reflects these values for each of reputation nodes 1610 (1)-(5), and so informs the topology thereof and the operations with respect to clustering performed.

TABLE 2

Reputation graph node (message destination) reputation values.

| Reputation Node (RN) | Value |
| --- | --- |
| RN 1610 (1) | 3 |
| RN 1610 (2) | 6 |
| RN 1610 (3) | 4 |
| RN 1610 (4) | 7 |
| RN 1610 (5) | 2 |

It will be appreciated that, in light of the present disclosure, the reputation of a given reputation node (message destination) can be considered in determining the overall reputation of the reputation cluster to which the reputation node (and so, message destination) belongs. Thus, once a reputation cluster has been defined, the reputations of the reputation nodes (message destinations) therein can be used to determine an overall reputation for the given reputation cluster. Further, in the creation of a reputation cluster, such reputation information can be considered in the operations that aggregate reputation nodes into reputation clusters.

For example, reputation nodes having a reputation at or below a certain threshold can be clustered together based simply on the existence of an edge therebetween, regardless of the degree to which the reputation nodes are related to one another (as indicated by the value assigned to the reputation graph edge value therebetween), although such degree of relatedness can be used in conjunction therewith. In the example depicted in FIG. 16, this might result in reputation nodes 1610(1), 1610(3) and 1610(5) being in the same cluster (in the manner shown), with an overall cluster reputation calculated by averaging each reputation node's reputation value (resulting in a cluster reputation of 3). As will be apparent in light of the present disclosure, a cluster reputation value can be calculated in any number of ways. Alternatively (e.g., with a reputation threshold of 3), only reputation nodes 1610(1) and 1610(5) would be in the same cluster (or could form a sub-cluster of reputation cluster 1600). As will be appreciated, in the posited example (using an average of the reputation nodes' reputation values), the cluster reputation value (or sub-cluster reputation value) would be 2.5. Further still, the aforementioned techniques are examples of the more general concept of identifying interactions that a given set of message destinations may have with a given (low-reputation) message destination, as represented by their respective reputation nodes. A cluster can be defined as including the k nearest reputation nodes (message destinations).

Thus, the more recently (and/or frequently) a given reputation node (message destination) receives messages from the low-reputation reputation node (message destination), the "closer" the given reputation node (message destination) is deemed to be to the low-reputation reputation node (message destination). Once such relationships are determined, a cluster is defined by the "closeness" between two reputation nodes required to constitute reputation nodes being in the same cluster. As will be apparent in light of the present disclosure, then, the clustering of reputation nodes and determination of cluster reputation values can be determined in a number of ways.

An Example Computing and Network Environment

As shown above, the systems described herein can be implemented using a variety of computer systems and networks. Examples of such computing and network environments are described below with reference to FIGS. 17 and 18.

Figure 17:
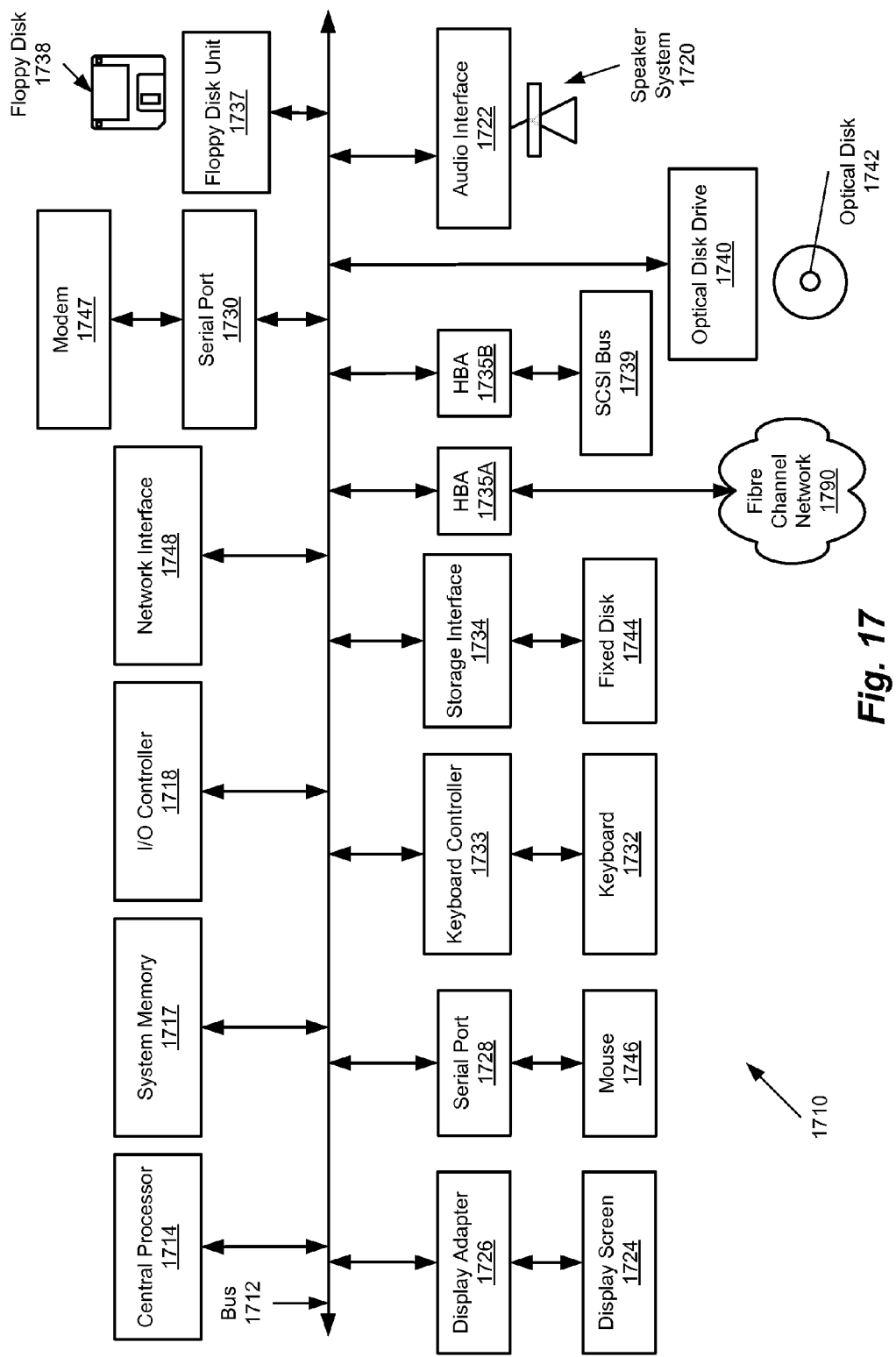
FIG. 17 is a block diagram depicting a computer system suitable for implementing embodiments of the systems described herein.

FIG. 17 depicts a block diagram of a computer system 1710 suitable for implementing aspects of the systems described herein (e.g., web servers 930(1)-(N), clients 925 (1)-(N), and the like). Computer system 1710 includes a bus 1712 which interconnects major subsystems of computer system 1710, such as a central processor 1714, a system memory 1717 (typically RAM, but which may also include ROM, flash RAM, or the like), an input/output controller 1718, an external audio device, such as a speaker system 1720 via an audio output interface 1722, an external device, such as a display screen 1724 via display adapter 1726, serial ports 1728 and 1730, a keyboard 1732 (interfaced with a keyboard controller 1733), a storage interface 1734, a floppy disk drive 1737 operative to receive a floppy disk 1738, a host bus adapter (HBA) interface card 1735A operative to connect with a Fibre Channel network 1790, a host bus adapter (HBA) interface card 1735B operative to connect to a SCSI bus 1739, and an optical disk drive 1740 operative to receive an optical disk 1742. Also included are a mouse 1746 (or other point-and-click device, coupled to bus 1712 via serial port 1728), a modem 1747 (coupled to bus 1712 via serial port 1730), and a network interface 1748 (coupled directly to bus 1712).

Bus 1712 allows data communication between central processor 1714 and system memory 1717, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1710 are generally stored on and accessed from a computer-readable storage medium, such as a hard disk drive (e.g., fixed disk 1744), an optical drive (e.g., optical drive 1740), a floppy disk unit 1737, or other computer-readable storage medium.

Storage interface 1734, as with the other storage interfaces of computer system 1710, can connect to a standard computer-readable medium for storage and/or retrieval of information, such as a fixed disk drive 1744. Fixed disk drive 1744 may be a part of computer system 1710 or may be separate and accessed through other interface systems. Modem 1747 may provide a direct connection to a remote server via a telephone link or to the Internet via an internet service provider (ISP). Network interface 1748 may provide a direct connection to a remote server via a direct network link to the Internet via a POP (point of presence). Network interface 1748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 17 need not be present to practice the systems described herein. The devices and subsystems can be interconnected in different ways from that shown in FIG. 17. The operation of a computer system such as that shown in FIG. 17 is readily known in the art and is not discussed in detail in this application. Code to implement the modules of the systems described herein can be stored in computer-readable storage media such as one or more of system memory 1717, fixed disk 1744, optical disk 1742, or floppy disk 1738. The operating system provided on computer system 1710 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 18:
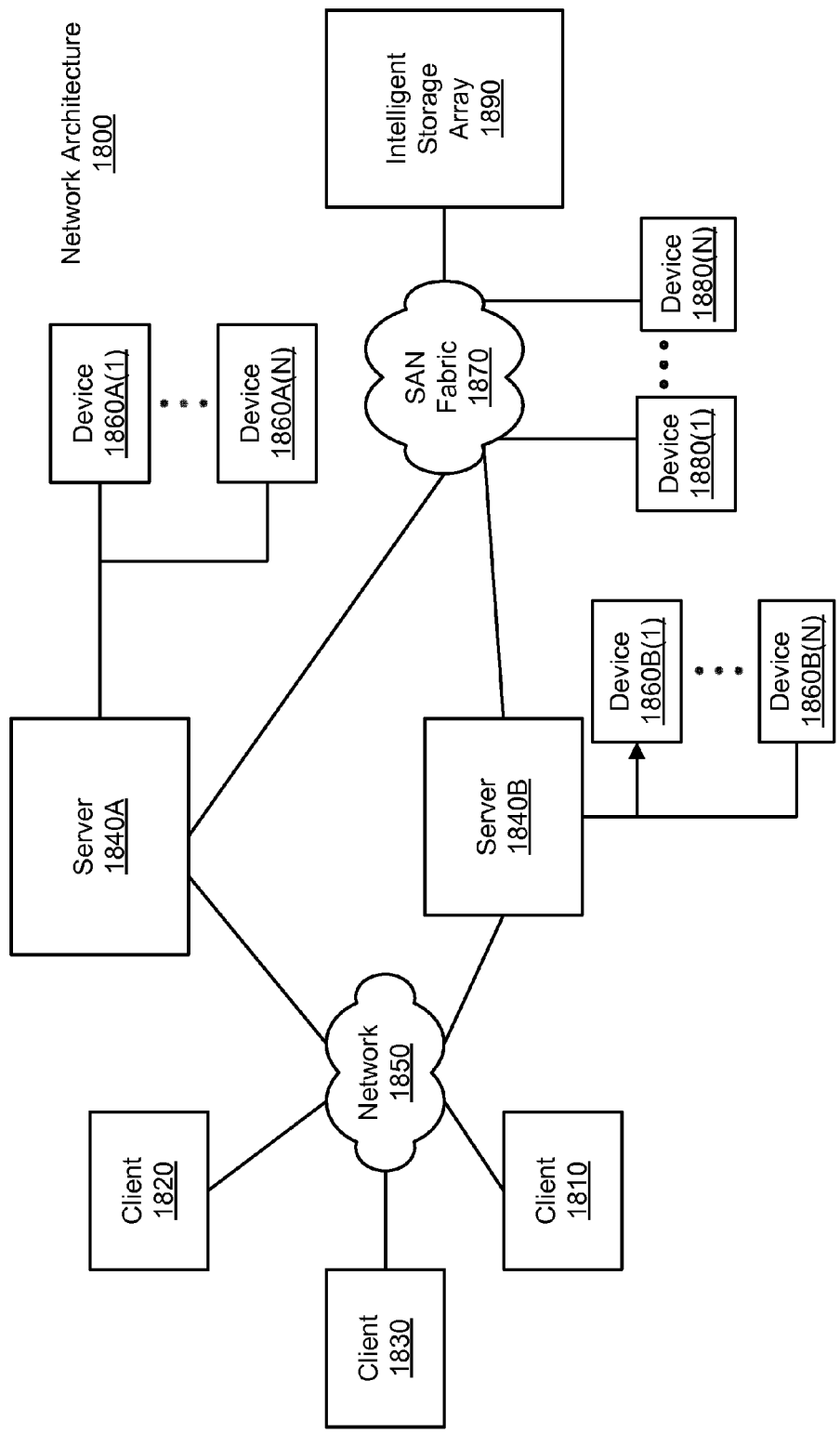
FIG. 18 is a block diagram depicting a network architecture suitable for implementing embodiments of the systems described herein.

FIG. 18 is a block diagram depicting a network architecture 1800 in which client systems 1810, 1820 and 1830, as well as storage servers 1840A and 1840B (any of which can be implemented using computer system 1810), are coupled to a network 1850. Storage server 1840A is further depicted as having storage devices 1860A(1)-(N) directly attached, and storage server 1840B is depicted with storage devices 1860B(1)-(N) directly attached. Storage servers 1840A and 1840B are also connected to a SAN fabric 1870, although connection to a storage area network is not required for operation. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870.

With reference to computer system 1710, modem 1747, network interface 1748 or some other method can be used to provide connectivity from each of client computer systems 1810, 1820 and 1830 to network 1850. Client systems 1810, 1820 and 1830 are able to access information on storage server 1840A or 1840B using, for example, a web browser or other client software (not shown). Such a client allows client systems 1810, 1820 and 1830 to access data hosted by storage server 1840A or 1840B or one of storage devices 1860A(1)-(N), 1860B(1)-(N), 1880(1)-(N) or intelligent storage array 1890. FIG. 18 depicts the use of a network such as the Internet for exchanging data, but the systems described herein are not limited to the Internet or any particular network-based environment.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 1710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
    detecting occurrence of a plurality of events, wherein
        occurrence of each of the plurality of detected events indicates that a message should be scanned,
        the message comprises recipient information,
        the recipient information identifies a recipient of the message,
        the message has been received at a message destination associated with the recipient, and
        the message destination comprises a message store;
    wherein the plurality of events comprise:
        a first event including receipt of the message at the message destination,
        a second event including receipt of a malware definition at the message destination, and
        a third event including receipt of a request at the message destination by the recipient to provide access to the message from the message store, and
    performing a plurality of scans of the message in succession and at different periods in response to detecting occurrence of the first event, the second event, and the third event;
    wherein performing the plurality of scans comprises:
        performing a first scan of the message, responsive to detecting the first event,
        performing a second scan of the message, responsive to detecting the second event, and
        performing a third scan of the message, responsive to detecting the third event.

2. The method of claim 1, wherein at least one scan of the plurality of scans comprises:
    reading the message from the message store.

3. The method of claim 1, wherein
    detecting occurrence of a plurality of events further comprises detecting occurrence of at least one additional event from a group consisting of:
        receipt of a new malware definition at the message destination, and
        expiration of a time period.

4. The method of claim 3, further comprising:
    determining whether the time period has expired; and
    responsive to the time period having expired, determining whether an additional scan of the message should be performed.

5. The method of claim 4, wherein
    determining whether the additional scan of the message should be performed comprises:
        determining whether the new malware definition is available from a local cache;
        if the new malware definition is available from the local cache,
            retrieving the new malware definition from the local cache, and
            indicating that a fifth scan of the message should be performed using the new malware definition retrieved from the local cache.

6. The method of claim 5, wherein
    determining whether the additional scan of the message should be performed further comprises:
        if the new malware definition is not available from the local cache,
            determining whether the new malware definition is available from a server,
        if the new malware definition is available from the server,
            obtaining the new malware definition from the server, and
            indicating that the fifth scan of the message should be performed using the new malware definition from the server, and if the new malware definition is not available from the server, indicating that the fifth scan of the message should not be performed.

7. The method of claim 1, wherein the message is one of a plurality of messages, and the method further comprises:
   assigning a priority level of a plurality of priority levels to each message of the plurality of messages;
   determining a scan order in which to scan the plurality of messages, wherein
      the order is based, at least in part, on a priority level of a plurality of priority levels assigned to each message of the plurality of messages; and
   performing a plurality of scans of the plurality of messages, wherein the messages are scanned using the scan order.

8. The method of claim 7, further comprising:
   scheduling the scanning to occur at a specified time, wherein
      at least one event is the occurrence of the specified time for the scheduled scanning.

9. The method of claim 8, further comprising:
   scheduling a plurality of scheduled scans, wherein
      the plurality of scheduled scans comprises the scanning, and
      the scheduling the plurality of scheduled scans comprises
         scheduling each scheduled scan of the plurality of scheduled scans to occur at one of a plurality of specified times; and
      assigning a priority level to the each scheduled scan of the plurality of scheduled scans; and
      performing certain scheduled scans of the plurality of scheduled scans according to a priority level of each of the certain scheduled scans, wherein
         the each of the certain scheduled scans are scheduled to be performed at a scheduled time of the plurality of scheduled times.

10. The method of claim 9, wherein
   the priority level of the plurality of priority levels of each message of the plurality of messages is based, at least in part, on a reputation of a the message destination of the each message of the messages.

11. The method of claim 10, further comprising:
   assigning one or more priority levels to one or more message destinations by
      determining one or more criteria by which to prioritize the message destinations,
      evaluating each of the message destinations using the one or more criteria, and
      assigning the each of the message destinations a message destination reputation of a plurality of message destination reputations, wherein
         the plurality of message destination reputations comprise the reputation, and
         the assigning is based, at least in part, on the evaluating.

12. A computer program product comprising:
   a plurality of instructions, comprising
      a first set of instructions, executable on a computer system, configured to detect occurrence of a plurality of events, wherein
         occurrence of each of the plurality of detected events indicates that a message should be scanned,
         the message comprises recipient information,
         the recipient information identifies a recipient of the message,
         the message has been received at a message destination associated with the recipient, and
         the message destination comprises a message store; and
      wherein the plurality of events comprise:
         a first event including receipt of the message at the message destination,
         a second event including receipt of the malware definition at the message destination, and
         a third event including receipt of a request at the message destination, and
      a second set of instructions, executable on the computer system, configured to perform a plurality of scans of the message in succession and at different periods in response to detecting occurrence of the first event, the second event, and the third event;
      wherein performing the plurality of scans comprises:
         performing a first scan of the message, responsive to detecting the first event,
         performing a second scan of the message, responsive to detecting the second event, and
         performing a third scan of the message, responsive to detecting the third event; and
      a non-transitory computer-readable storage medium, wherein the instructions are encoded in the non-transitory computer-readable storage medium.

13. The computer program product of claim 12, wherein the plurality of instructions further comprise:
   a third set of instructions, executable on the computer system, configured to determine whether a time period has expired; and
   a fourth set of instructions, executable on the computer system, configured to determine whether an additional scan of the message should be performed, responsive to the time period having expired.

14. The computer program product of claim 12, wherein, the message is one of a plurality of messages, and the plurality of instructions further comprise:
   a fourth set of instructions, executable on the computer system, configured to assign a priority level of a plurality of priority levels to each message of the plurality of messages;
   a fifth set of instructions, executable on the computer system, configured to determine a scan order in which to scan the plurality of messages, wherein
      the order is based, at least in part, on a priority level of a plurality of priority levels assigned to each message of the plurality of messages; and
   a sixth set of instructions, executable on the computer system, configured to perform a plurality of scans of the plurality of messages, wherein the messages are scanned using the scan order.

15. The computer program product of claim 14, wherein the plurality of instructions further comprise:
   a seventh set of instructions, executable on the computer system, configured to schedule the scanning to occur at a specified time, wherein
      at least one event is the occurrence of the specified time for the scheduled scanning.

16. The computer program product of claim 15, wherein, the priority level is based, at least in part, on a reputation of a message destination of the each message of the plurality of messages.

17. A computer system comprising:
   one or more processors;
   a computer-readable storage medium coupled to the one or more processors; and a plurality of instructions, encoded in the computer-readable storage medium and configured to cause the one or more processors to
detect occurrence of a plurality of events, wherein
occurrence of each of the plurality of detected events indicates that a message should be scanned,
the message comprises recipient information,
the recipient information identifies a recipient of the message,
the message has been received at a message destination associated with the recipient, and
the message destination comprises a message store, and
wherein the plurality of events comprise:
a first event including receipt of the message at the message destination,
a second event including receipt of a malware definition at the message destination, and
a third event including receipt of a request at the message destination by the recipient to provide access to the message from the message store, and
perform a plurality of scans of the message in succession and at different periods in response to detecting occurrence of the first event, the second event, and the third event;
wherein performing the plurality of scans comprises:
performing a first scan of the message, responsive to detecting first event,
performing a second scan of the message, responsive to detecting the second event, and
performing a third scan of the message, responsive to detecting being the third event.

* * * * *